(12) United States Patent
Dole et al.

(10) Patent No.: US 7,996,981 B2
(45) Date of Patent: Aug. 16, 2011

(54) METHOD OF JOINING PIPES IN END TO END RELATION

(75) Inventors: Douglas R. Dole, Whitehouse Station, NJ (US); Anthony J. Cuvo, Coopersburg, PA (US)

(73) Assignee: Victaulic Company, Easton, PA (US)

( * ) Notice: Subject to any disclaimer, the term of this patent is extended or adjusted under 35 U.S.C. 154(b) by 328 days.

(21) Appl. No.: 12/271,992

(22) Filed: Nov. 17, 2008

(65) Prior Publication Data

US 2009/0127846 A1    May 21, 2009

Related U.S. Application Data

(63) Continuation of application No. 11/091,216, filed on Mar. 28, 2005, now abandoned.

(60) Provisional application No. 60/556,962, filed on Mar. 26, 2004.

(51) Int. Cl.
*B23P 11/00* (2006.01)
(52) U.S. Cl. ................................... 29/525.02
(58) Field of Classification Search ............... 29/525.02, 29/525.01, 463, 428, 237, 238; 285/24, 112, 285/373, 419, 416, 110, 364–367
See application file for complete search history.

(56) References Cited

U.S. PATENT DOCUMENTS

| | | |
|---|---|---|
| 1,331,986 A | 2/1920 | Griffin |
| 2,821,415 A | 1/1958 | Race, Jr. |
| 3,006,663 A | 10/1961 | Bowne |
| 3,015,502 A | 1/1962 | Frost et al. ............ 285/112 |
| 3,024,046 A | 3/1962 | Frost et al. |
| 3,054,629 A | 9/1962 | Piatek |
| 3,086,797 A | 4/1963 | Webb |
| 3,201,149 A | 8/1965 | Bragg ..................... 285/39 |
| 3,283,553 A | 11/1966 | Taylor ..................... 72/116 |
| 3,291,506 A | 12/1966 | Blakeley |
| 3,351,352 A | 11/1967 | Blakely et al. .......... 285/112 |
| 3,362,730 A | 1/1968 | St. Clair et al. |
| 3,403,931 A | 10/1968 | Crain et al. |
| 3,648,503 A | 3/1972 | Harper |
| 3,696,885 A | 10/1972 | Grieg et al. |
| 3,977,705 A | 8/1976 | Thiessen et al. |
| 4,114,414 A | 9/1978 | Goodman ................ 72/105 |
| 4,144,733 A | 3/1979 | Whitten |
| 4,163,571 A | 8/1979 | Nash |
| 4,311,248 A | 1/1982 | Westerlund et al. ..... 277/206 R |
| 4,408,788 A | 10/1983 | Beukema |
| 4,432,558 A | 2/1984 | Westerlund et al. ..... 277/180 |
| 4,460,201 A | 7/1984 | McGugan |
| 4,522,433 A | 6/1985 | Valentine et al. ........ 285/93 |
| 4,643,461 A | 2/1987 | Thau, Jr. et al. |

(Continued)

OTHER PUBLICATIONS

EP 05 73 1364—European Search Report dated Oct. 7, 2010.

(Continued)

*Primary Examiner* — John C Hong
(74) *Attorney, Agent, or Firm* — Ballard Spahr LLP

(57) ABSTRACT

A method for connecting pipe elements together end to end. The method includes providing a coupling having a plurality of segments with at least one camming surface, the segments being joined end to end by a plurality of adjustably tightenable fasteners, positioning a first and a second of the pipe elements in end to end relation, positioning the segments surrounding the ends of the pipe elements, engaging the camming surfaces on the segments with grooves on the pipe elements and tightening the fasteners so as to draw the segments toward one another. The camming surfaces slide into the grooves and move the first and second pipe elements away from one another.

16 Claims, 18 Drawing Sheets

U.S. PATENT DOCUMENTS

| | | | | |
|---|---|---|---|---|
| 4,702,500 | A | 10/1987 | Thau, Jr. et al. | 285/112 |
| 4,915,418 | A | 4/1990 | Palatchy | 285/24 |
| 5,018,768 | A | 5/1991 | Palatchy | |
| 5,058,931 | A | 10/1991 | Bowsher | 285/112 |
| 5,149,143 | A | 9/1992 | Howell | |
| 5,246,256 | A | 9/1993 | Rung et al. | 285/55 |
| 5,249,829 | A | 10/1993 | Hendrickson | |
| 5,282,654 | A | 2/1994 | Hendrickson | |
| 5,291,769 | A | 3/1994 | Miyano | 72/121 |
| 5,443,581 | A | 8/1995 | Malone | |
| 5,450,738 | A | 9/1995 | Chatterley et al. | 72/106 |
| 5,603,508 | A | 2/1997 | Dole et al. | 285/112 |
| 5,778,715 | A | 7/1998 | Lippka et al. | 72/106 |
| 5,951,066 | A | 9/1999 | Lane et al. | |
| 5,979,202 | A | 11/1999 | Blakeley | |
| 6,070,914 | A | 6/2000 | Schmidt | 285/112 |
| 6,196,039 | B1 | 3/2001 | Williams et al. | |
| 6,227,577 | B1 | 5/2001 | Ikeda et al. | 285/112 |
| 6,371,684 | B2 | 4/2002 | Giesenberg et al. | |
| 6,375,228 | B1 | 4/2002 | Klemm et al. | |
| 6,393,885 | B1 | 5/2002 | Cadena | 72/110 |
| 6,606,893 | B2 | 8/2003 | Hamm et al. | |
| 6,935,152 | B2 | 8/2005 | Dole et al. | |
| 7,296,451 | B2 | 11/2007 | Dole | |
| 2001/0054820 | A1 | 12/2001 | Starita | |
| 2005/0034499 | A1 | 2/2005 | Matsumoto | 72/214 |
| 2005/0212296 | A1 | 9/2005 | Dole | |
| 2005/0242585 | A1 | 11/2005 | Dole et al. | |

OTHER PUBLICATIONS

Victaulic IPS Carbon Steel Pipe Grooved Couplings, Style 07 Zero-Flex® Rigid Coupling (2 pages); dated Apr. 1999.

Victaulic IPS Carbon Steel Pipe—Grooved Couplings, Style 77 Standard Flexible Coupling (2 pages); copyright 2003.

Victaulic IPS Carbon Steel Pipe Grooved Couplings. Style HP-70 Rigid Coupling (2 pages); dated Nov. 1996.

Budtz-Olsen, A.; Singapore Examination Report from related Singapore patent application No. 200903550-2; Danish Patent and Trademark Office; Feb. 28, 2011; pp. 1-9.

Budtz-Olsen, A.; Singapore Search Report from related Singapore patent application No. 200903550-2; Danish Patent and Trademark Office; Feb. 28, 2011; pp. 1-7.

Dunwoody, Aaron M., Non-Final Office Action from related U.S. Appl. No. 11/091,216; United States Patent and Trademark Office; pp. 1-12; Sep. 26, 2006.

Chionchio, John A., Response to Non-Final Office Action from related U.S. Appl. No. 11/091,216; pp. 1-20; Nov. 20, 2006.

Dunwoody, Arron M., Non-Final Office Action from related U.S. Appl. No. 11/091,216; United States Patent and Trademark Office; pp. 1-10; Feb. 9, 2007.

Chionchio, John A., Response to Non-Final Office Action from related U.S. Appl. No. 11/091,216; pp. 1-16; Jun. 8, 2007.

Dunwoody, Arron M., Final Office Action from related U.S. Appl. No. 11/091,216; United States Patent and Trademark Office; pp. 1-12; Aug. 22, 2007.

Chionchio, John A., Request for Continued Examination and Amendment from related U.S. Appl. No. 11/091,216; pp. 1-14; Oct. 31, 2007.

Dunwoody, Arron M., Non-Final Office Action from related U.S. Appl. No. 11/091,216; United States Patent and Trademark Office; pp. 1-11; Feb. 11, 2008.

Chionchio, John A., Response to Non-Final Office Action from related U.S. Appl. No. 11/091,216; pp. 1-8; Jul. 11, 2008.

Dunwoody, Arron M., Final Office Action from related U.S. Appl. No. 11/091,216; United States Patent and Trademark Office; pp. 1-5; Aug. 15, 2008.

Tolan, Edward Thomas, Non-Final Office Action from related U.S. Appl. No. 12/116,618; United States Patent and Trademark Office; pp. 1-4; Sep. 17, 2008.

Chionchio, John A., Response to Non-Final Office Action from related U.S. Appl. No. 12/116,618; pp. 1-9; Dec. 23, 2008.

Tolan, Edward Thomas, Notice of Allowance from related U.S. Appl. No. 12/166,618; United States Patent and Trademark Office; pp. 1-4; Feb. 13, 2009.

Dunwoody, Aaron M., Non-Final Office Action from related U.S. Appl. No. 11/091,146; United States Patent and Trademark Office; pp. 1-12; Sep. 22, 2006.

Chionchio, John A., Response to Non-Final Office Action from related U.S. Appl. No. 11/091,146; pp. 1-12; Dec. 22, 2006.

Dunwoody, Aaron M., Final Office Action from related U.S. Appl. No. 11/091,146; United States Patent and Trademark Office; pp. 1-10; Mar. 7, 2007.

Chionchio, John A., Response to Final Office action from related U.S. Appl. No. 11/091,146; pp. 1-16; Jul. 25, 2007.

Chionchio, John A., Appeal Brief from related U.S. Appl. No. 11/091,146; pp. 1-18; Jul. 27, 2007.

Dunwoody, Aaron M., Advisory Action from related U.S. Appl. No. 11/091,146; United States Patent and Trademark Office; pp. 1-3; Aug. 2, 2007.

Dunwoody, Aaron M., Non-Final Office Action from related U.S. Appl. No. 11/091,146; United States Patent and Trademark Office; pp. 1-8; Oct. 18, 2007.

Chionchio, John A., Response to Non-Final Office Action from related U.S. Appl. No. 11/091,146; pp. 1-9; Jan. 16, 2008.

Dunwoody, Aaron M., Final Office Action from related U.S. Appl. No. 11/091,146; United States Patent and Trademark Office; pp. 1-8; Apr. 10, 2008.

Hewitt, James M., Non-Final Office Action from related U.S. Appl. No. 11/091,147; United States Patent and Trademark Office; pp. 1-4, Apr. 6, 2007.

Chionchio, John A., Response to Non-Final Office Action from related U.S. Appl. No. 11/091,147; pp. 1-5; Apr. 17, 2007.

Hewitt, James M., Final Office Action from related U.S. Appl. No. 11/091,147; United States Patent and Trademark Office; pp. 1-5; Jun. 19, 2007.

Chionchio, John M., Response to Non-Final Office Action from related U.S. Appl. No. 11/091,147; pp. 1-7; Dec. 10, 2007.

Hewitt, James M., Final Office Action from related U.S. Appl. No. 11/091,147; United States Patent and Trademark Office; pp. 1-5; Mar. 17, 2008.

Wolfe, Debra M., Non-Final Office Action from related U.S. Appl. No. 11/091,460; United States Patent and Trademark Office; pp. 1-8; Apr. 17, 2006.

Chionchio, John A., Response to Non-Final Office Action from related U.S. Appl. No. 11/091,460; pp. 1-1-14; Jul. 17, 2006.

Wolfe, Debra M., Final Office Action from related U.S. Appl. No. 11/091,460; United States Patent and Trademark Office; pp. 1-6; Oct. 24, 2006.

Chionchio, John A., Response to Final Office Action from related U.S. Appl. No. 11/091,460; pp. 1-4; Jan. 22, 2007.

Chionichio, John A., Statement of Substance of Interview Pursuant to 37 CFR 1.333 from related U.S. Appl. No. 11/091,460; 1 page; Aug. 29, 2007.

Wolfe, Debra M., Notice of Allowance from related U.S. Appl. No. 11/091,460; United States Patent and Trademark Office; pp. 1-9; Aug. 23, 2007.

*FIG. 7E*
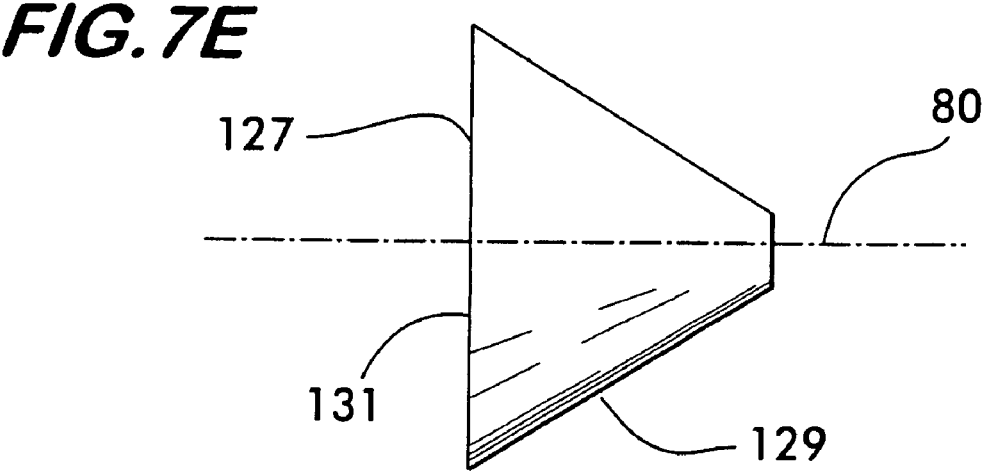
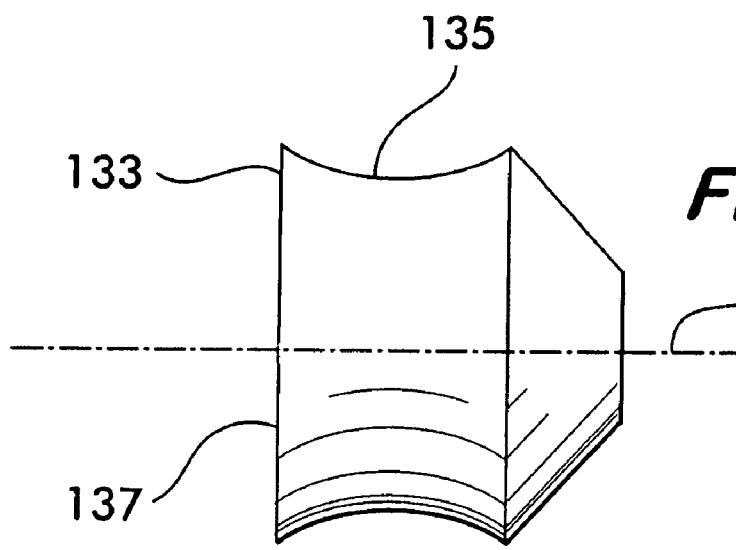
*FIG. 7F*
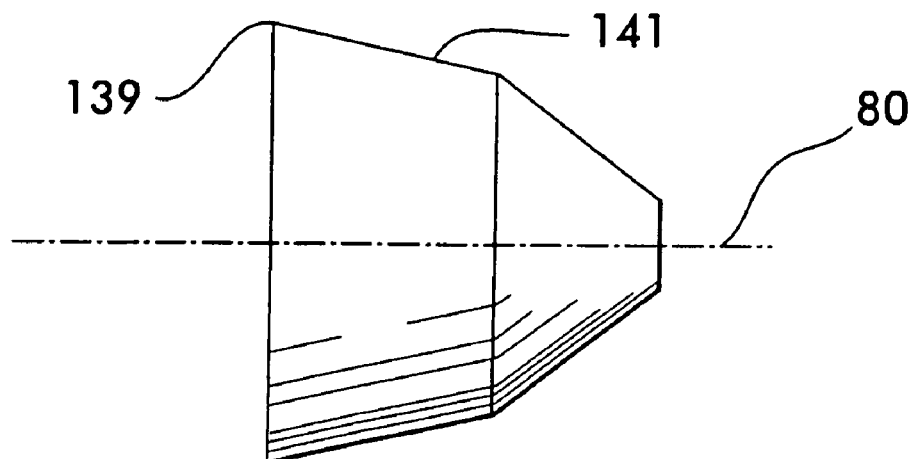
*FIG. 7G*

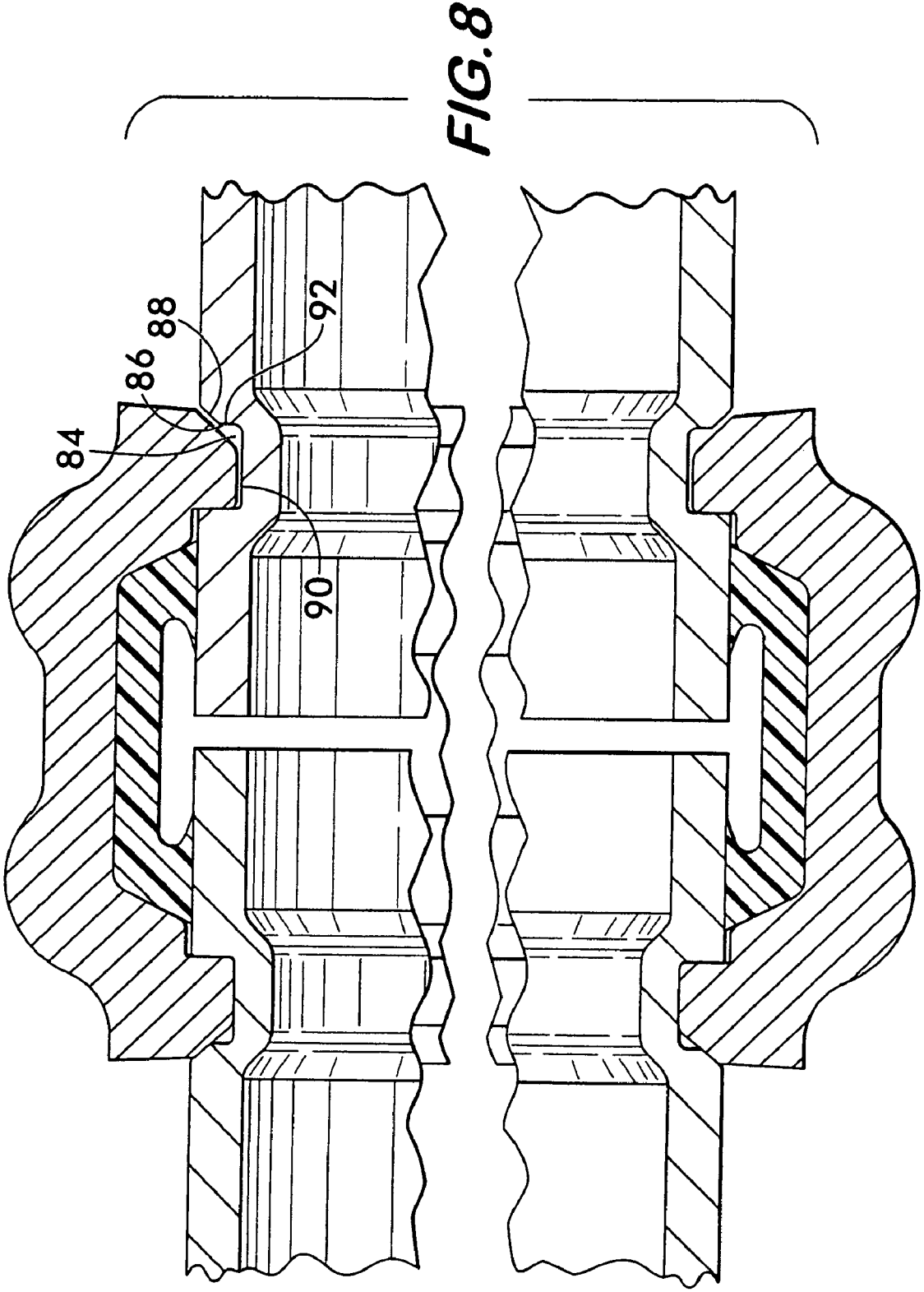

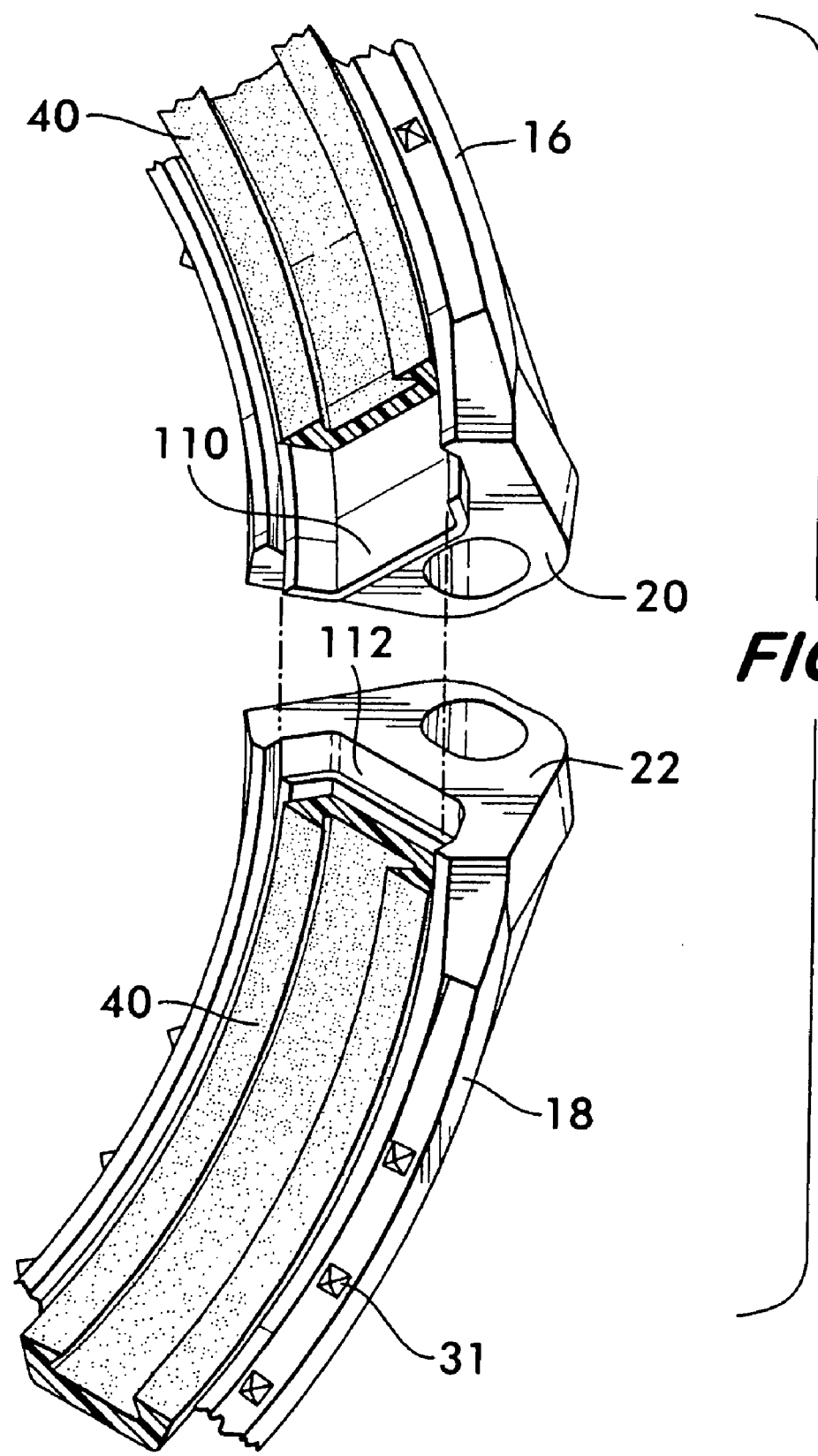

*FIG. 18*
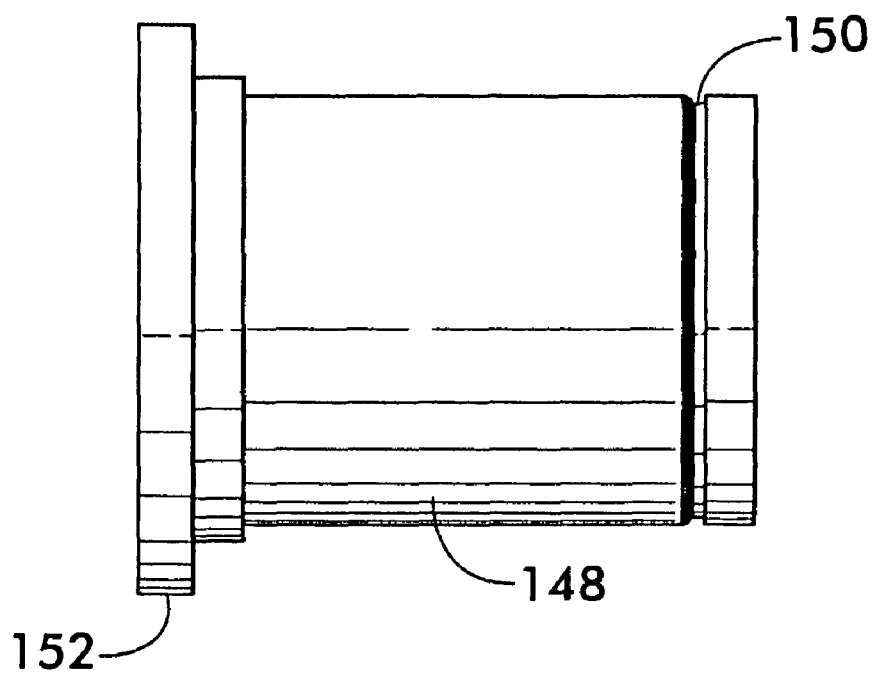
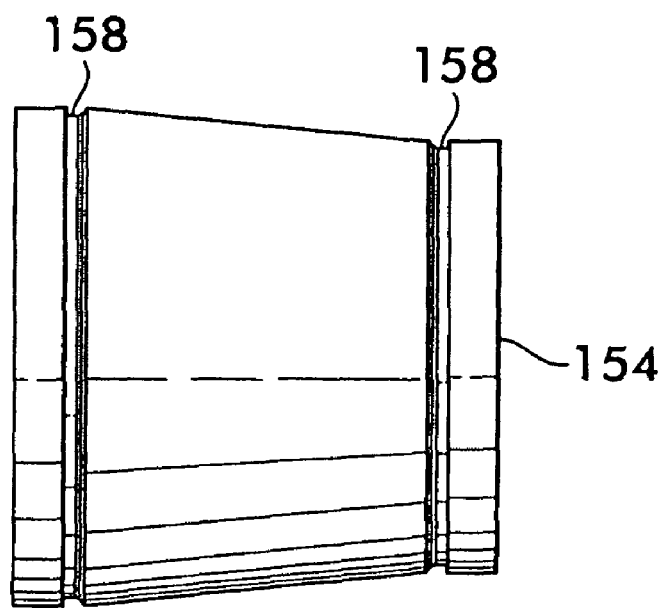
*FIG. 19*

FIG.20
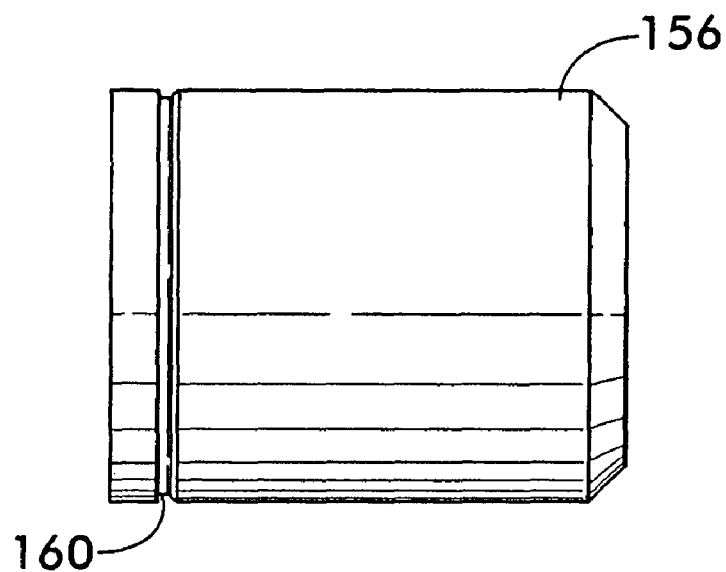
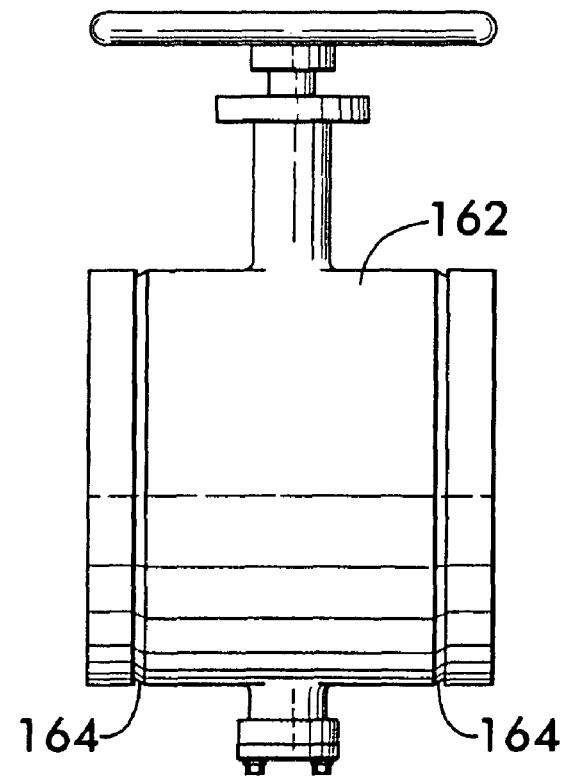
FIG.21

METHOD OF JOINING PIPES IN END TO END RELATION

CROSS REFERENCE TO RELATED APPLICATIONS

This application is a continuation of U.S. application Ser. No. 11/091,216 filed Mar. 28, 2005, which claims priority to U.S. Provisional Application No. 60/556,962, filed Mar. 26, 2004.

FIELD OF THE INVENTION

The invention concerns a method of using couplings for joining pipes in end to end relation and effecting a substantially rigid or a flexible fluid tight joint therebetween.

BACKGROUND OF THE INVENTION

Couplings for joining pipes together end to end comprise arcuate segments that circumferentially surround co-axially aligned pipes and engage circumferential grooves positioned proximate to the ends of each pipe. The couplings are also used to connect pipes to fluid control components such as valves, reducers, strainers, restrictors, pressure regulators, as well as components to components. Although in the description which follows pipes are described, they are used by way of example only, the invention herein not being limited for use only with pipes per se. It should also be noted that the term "pipe" as used herein refers to straight pipes as well as elbows, tees and other types of fittings.

The segments comprising the couplings have circumferential keys that extend radially inwardly toward the pipes and fit within the grooves around the pipes. The keys are typically somewhat narrower than the grooves to permit them to fit within the grooves and bear against the shoulders formed by the grooves to hold the pipes together against internal pressure and external forces that may be applied to the pipes. External forces may arise due to thermal expansion or contraction of the pipes due to changes in temperature as well as the weight of the pipes or components such as valves attached to the pipes, which can be significant for large diameter pipes and valves. Wind loads and seismic loads may also be a factor.

It is advantageous that pipe couplings be substantially rigid, i.e., resist rotation of the pipes relative to one another about their longitudinal axes, resist axial motion of the pipes relatively to one another due to internal pressure, and resist angular deflection of pipes relative to one another. A rigid coupling will be less likely to leak, requiring less maintenance, and will simplify the design of piping networks by eliminating or at least reducing the need for engineers to account for axial motion of pipes in the network when subjected to significant internal pressure. Pipes joined by rigid couplings require fewer supports to limit unwanted deflection. Furthermore, valves and other components which may tend to rotate out of position because their center of gravity is eccentric to the pipe axis will tend to remain in position and not rotate about the longitudinal axis under the pull of gravity when the pipe couplings are substantially rigid.

Many couplings according to the prior art do not reliably provide the desired degree of rigidity mainly because they use keys having rectangular cross-sections that are narrower than the width of the grooves that they engage. This condition may result in inconsistent contact between the coupling and the pipes which allows too much free play and relative movement, for example, axially, rotationally or angularly, between the pipes. It is also difficult to ensure that such keys properly engage the grooves. Couplings which provide a more rigid connection may be ineffective to force the pipe ends apart at a desired distance from one another so that the keys and grooves are in proper alignment and the pipes are properly spaced. When properly spaced apart, the pipe ends and the coupling cooperate with a sealing member positioned between the coupling and the pipe ends to ensure a fluid tight seal. The movement of the pipes, although small, is effected as the couplings are engaged with each other and the pipe and may require that significant torque be exerted upon the fasteners used to clamp the coupling to the pipes. This is especially acute when pipes to be joined are stacked vertically one above another, and the action of engaging the coupling with the pipes must lift one of the pipes upwardly relatively to the other in order to effect the proper spacing between the pipe ends. For such couplings, it is also difficult to reliably visibly ensure that the couplings have been properly installed so that the keys engage the grooves and the pipes are spaced apart as required to ensure a fluid tight seal.

It would be advantageous to provide a coupling that provides increased rigidity while also reducing the force necessary to engage the coupling with the pipe ends to effect their proper spacing, and also provides a reliable visual indication that the couplings are properly installed on the pipes.

SUMMARY OF THE INVENTION

The invention concerns a method for connecting pipe elements together end-to-end. The pipe elements have circumferential grooves proximate to each end. The method comprises:

providing a coupling comprising a plurality of segments joined end-to-end by a plurality of adjustably tightenable fasteners, each of the segments having a pair of keys projecting radially inwardly, the keys being positioned in spaced apart relation from one another and defining a space therebetween, at least one of the keys on one of the segments having a first camming surface positioned adjacent to one end of the segment, the first camming surface facing away from the space between the keys and being angularly oriented relatively thereto;

positioning a first and a second of the pipe elements in end-to-end relation;

positioning the plurality of segments surrounding ends of the first and second pipe elements;

engaging the first camming surface with the groove in one of the first and second pipe elements;

applying the fasteners to the segments; and tightening the fasteners so as to draw the segments toward one another, the first camming surface sliding into the groove and thereby moving the first and second pipe elements away from one another.

BRIEF DESCRIPTION OF THE DRAWINGS

FIGS. 7A-7G show side views of various embodiments of roller tools for forming a groove in a pipe;

FIG. 8 is a cross-sectional view of an alternate embodiment of the coupling;

FIG. 9 is a partial perspective view of an alternate embodiment of a coupling according to the invention;

FIGS. 16-21 illustrate various fittings and components having circumferential grooves according to the invention.

DETAILED DESCRIPTION OF THE EMBODIMENTS

Figure 1:
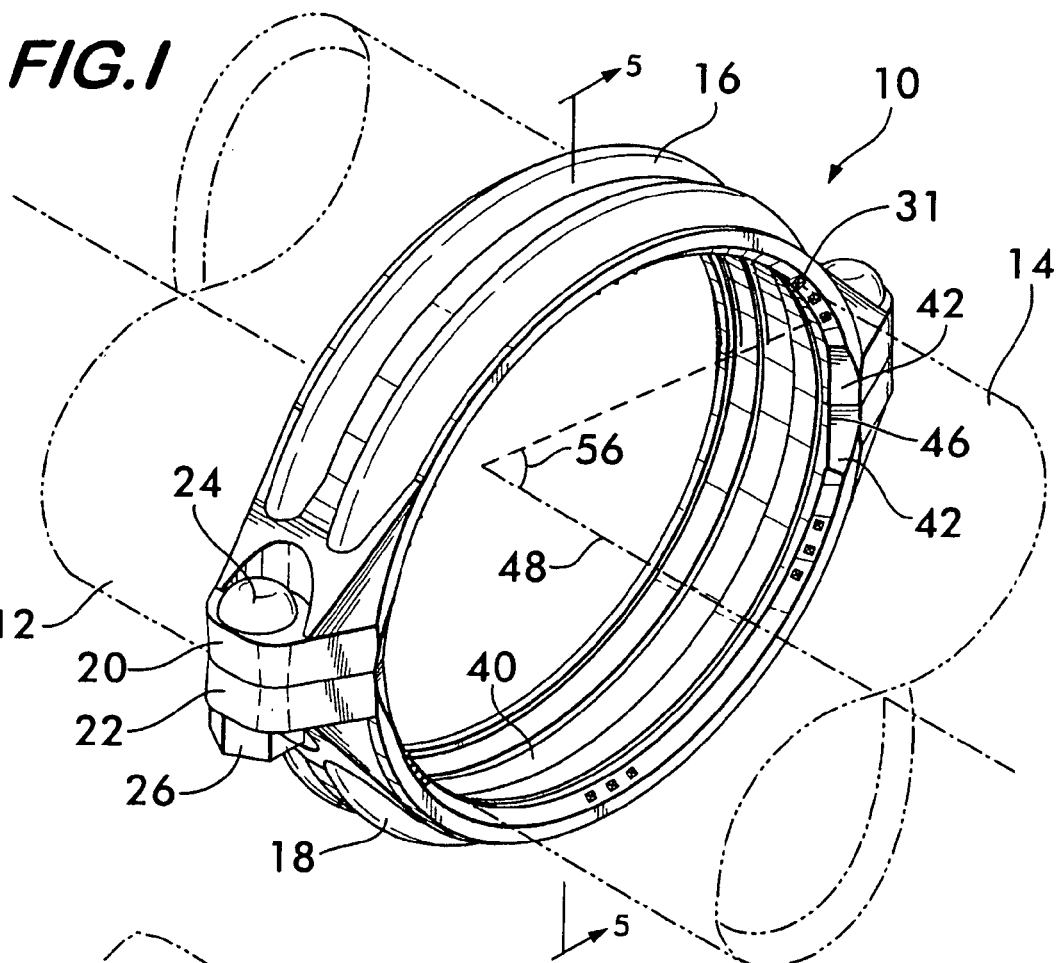
FIG. 1 is a perspective view of a coupling for connecting two pipes end to end, the pipes being shown in phantom line.
Figure 1A:
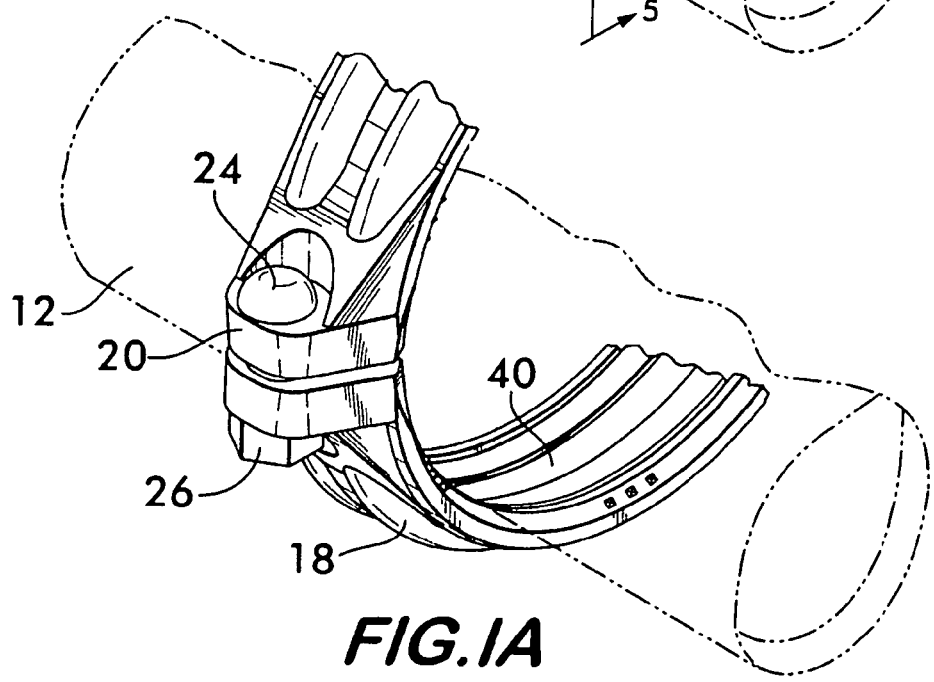
FIG. 1A is a perspective view showing a detail of the coupling depicted in FIG. 1.
Figure 2:
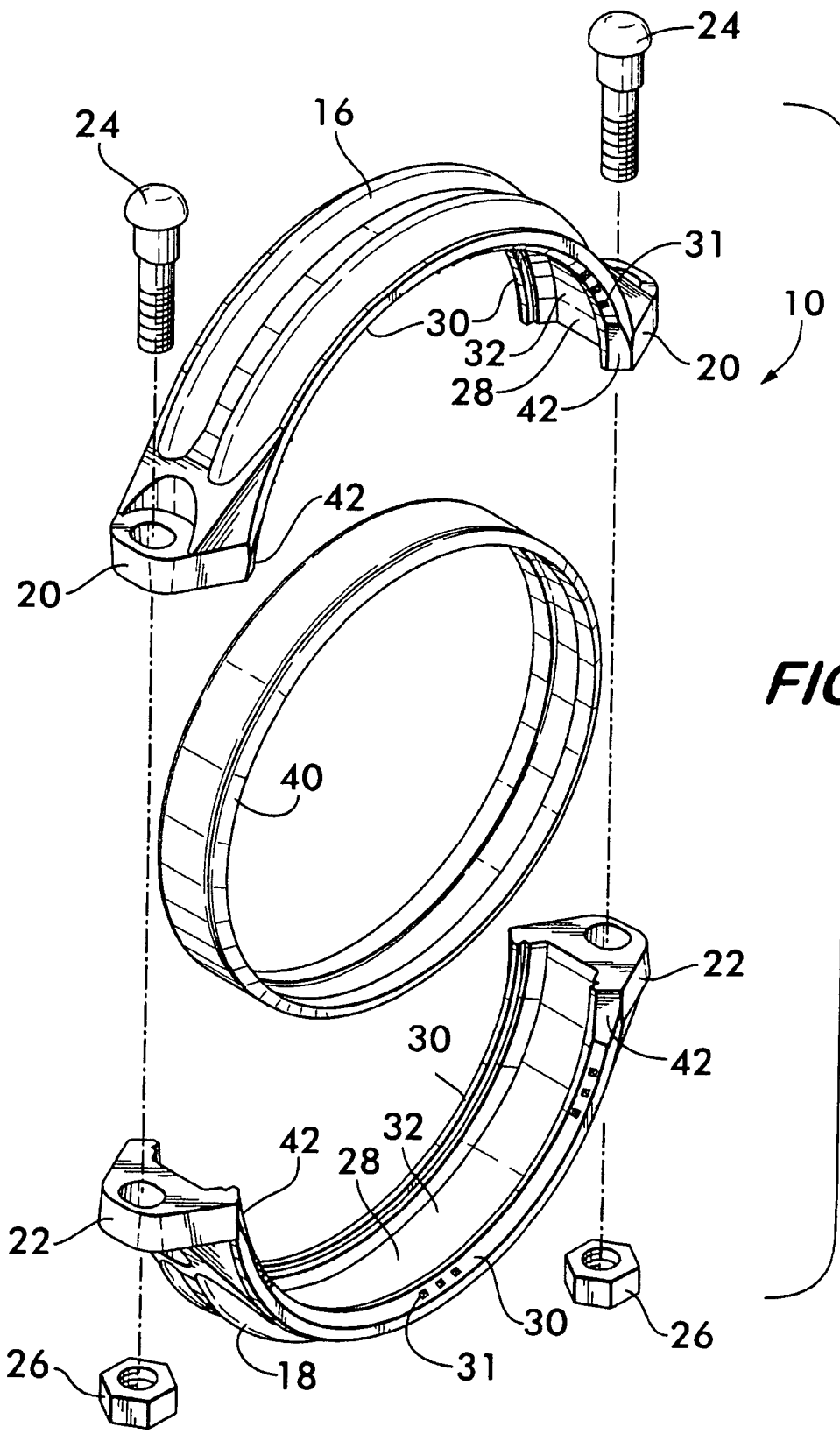
FIG. 2 is an exploded perspective view of the pipe coupling shown in FIG. 1.

FIG. 1 shows a pipe coupling 10 for connecting two pipes 12 and 14 co-axially end to end. As shown in FIG. 2, coupling 10 is comprised of at least two segments 16 and 18. Each segment 16 and 18 has lugs 20 and 22 respectively, the lugs being positioned at or proximate to each end of the segments. The lugs 20 at each end of segment 16 align with the lugs 22 at each end of segment 18. Lugs 20 and 22 are adapted to receive fasteners, preferably in the form of bolts 24 and nuts 26 for joining the segments to one another end to end surrounding the pipes 12 and 14. In one embodiment, shown in FIG. 1, the lugs 20 engage the lugs 22 in what is known as "pad-to-pad engagement" with the lugs contacting one another when the segments 16 and 18 are properly engaged with the pipes 12 and 14 as explained below. The lugs may also be attached to each other in spaced apart relation when the segments 16 and 18 are properly engaged with the pipes 12 and 14, as illustrated in FIG. 1A.

Although lugs are the preferred means for attaching the segments to one another end to end, it is recognized that there are other attachment means, such as circumferential bands, axial pins, and latching handles. These means are disclosed in U.S. Pat. Nos. 1,541,601, 2,014,313, 2,362,454, 2,673,102, 2,752,174, 3,113,791, and 4,561,678, all of which are hereby incorporated by reference.

Figure 2A:
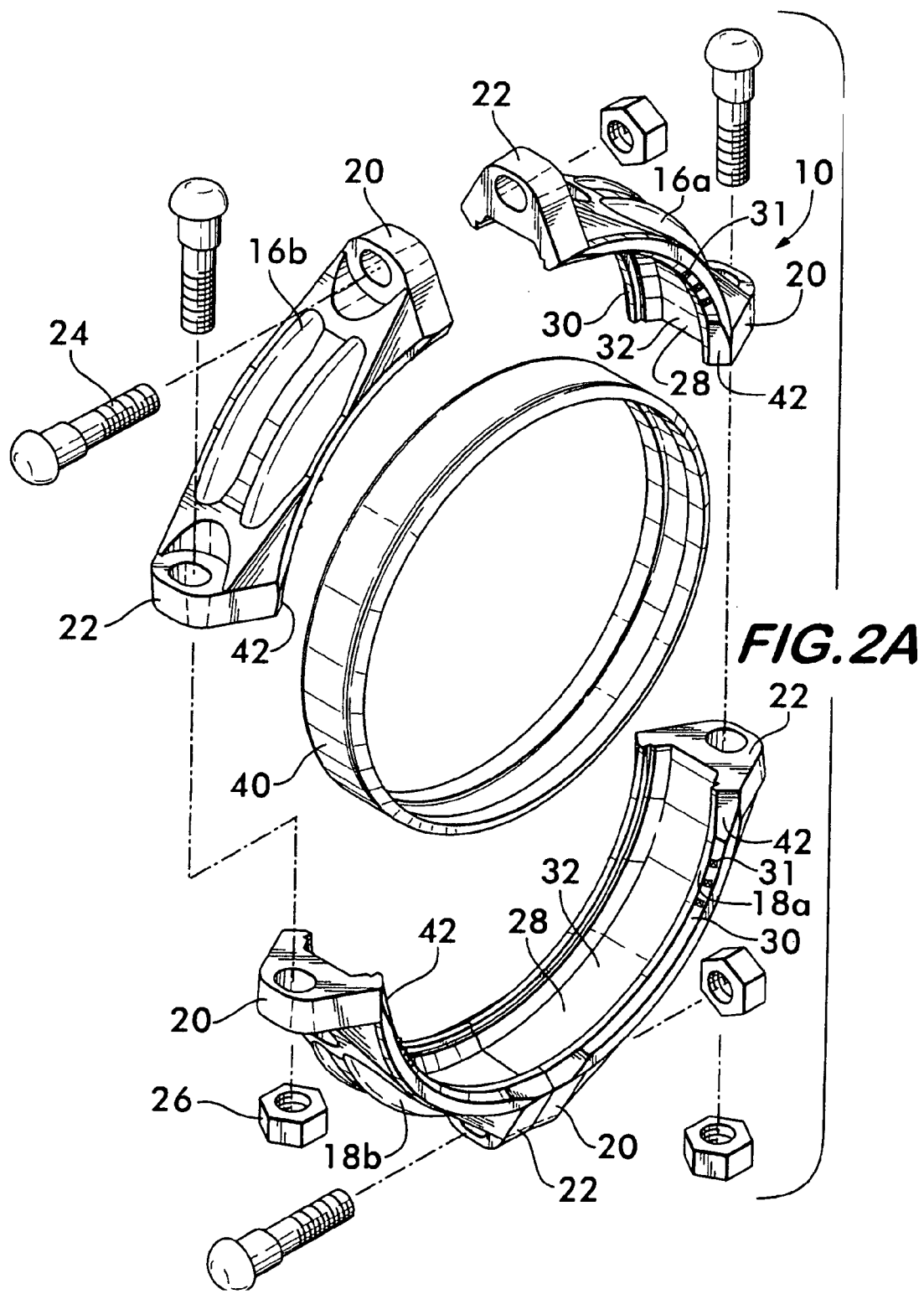
FIG. 2A is an exploded perspective view of an alternate embodiment of a pipe coupling according to the invention.

For large diameter pipes, it is sometimes advantageous to form the coupling 10 from more than two segments. As shown in FIG. 2A, pipe coupling 10 comprises segments 16a and 16b joined to each other and to segments 18a and 18b, also joined to one another. Each segment again preferably has lugs 20 and 22 at each end thereof, the segments being joined to one another end to end by fasteners such as bolts 24 and nuts 26. The following description of the coupling 10 is provided by way of example, and is based upon a coupling having two segments with lugs at either end. Various aspects of the description are applicable to alternate embodiments regardless of the number of segments comprising the coupling or the manner in which the segments are attached to one another.

Figure 5:
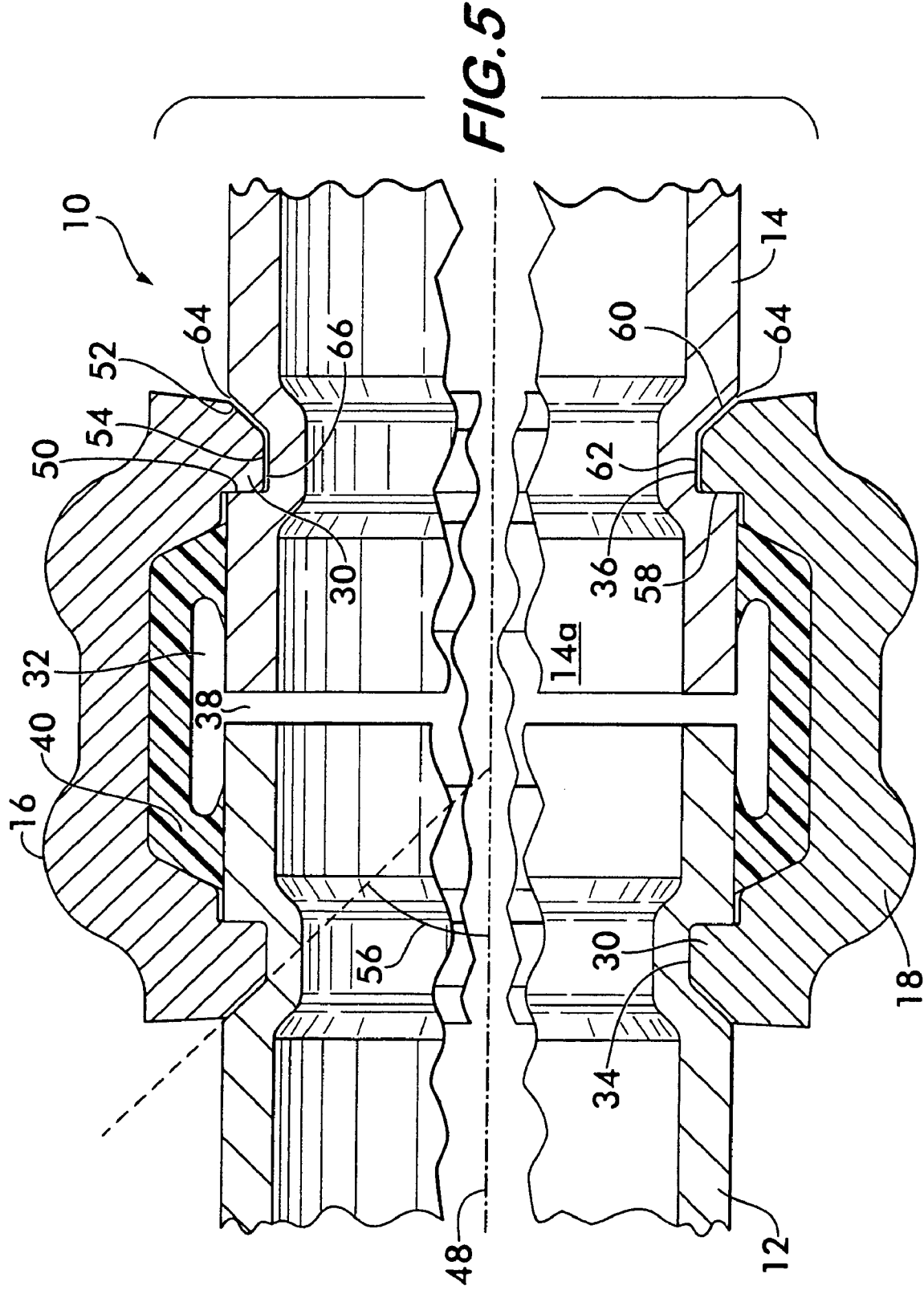
FIG. 5 is a cross-sectional view taken at line 5-5 of FIG. 1.

As shown in FIG. 2, each segment 16 and 18 has an arcuate surface 28 facing inwardly toward pipes 12 and 14. A pair keys 30 project radially inwardly from the arcuate surface 28. Keys 30 on each segment are in spaced apart relation to one another and define a space 32 between them. As best shown in FIG. 5, to effect the connection between pipes 12 and 14, keys 30 engage grooves 34 and 36 extending circumferentially around pipes 12 and 14 respectively. Engagement of keys 30 with grooves 34 and 36 substantially rigidly connect the pipes 12 and 14 coaxially to one another and maintain them at a predetermined separation as indicated by the gap 38. A sealing member 40 is positioned within space 32 and between the arcuate surfaces 28 of segments 16 and 18 and the pipes 12 and 14. The gap 38 between the pipes 12 and 14 provides tolerance facilitating mounting of the coupling and allows pressurized fluid to apply hydraulic pressure to the sealing member 40 and ensure a fluid tight seal between the pipes 12 and 14.

Figure 2B:
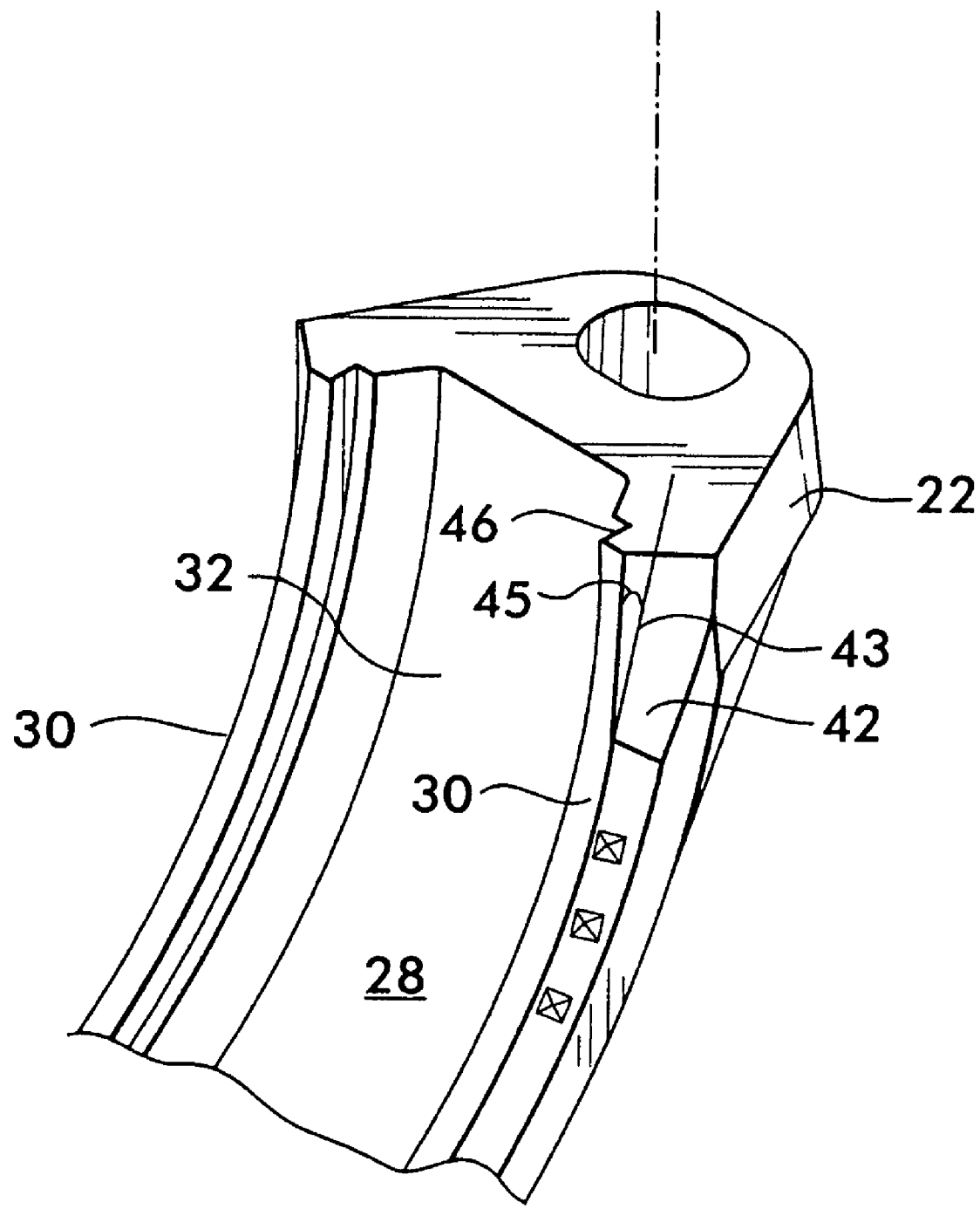
FIG. 2B is a perspective view of a portion of FIG. 2 shown on an enlarged scale.
Figure 3:
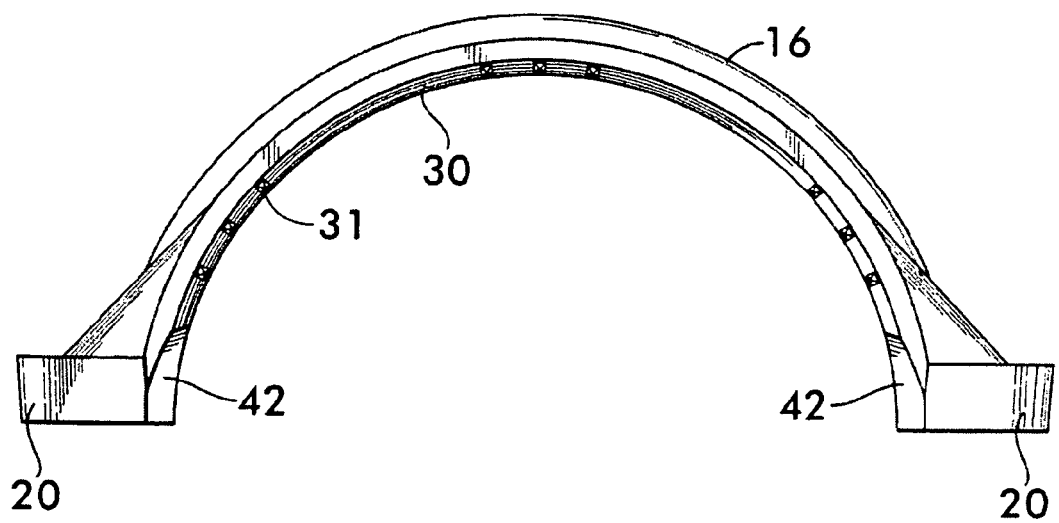
FIG. 3 is a side view of a segment comprising the coupling shown in FIG. 1.

As best shown in FIGS. 2 and 3, each key 30 preferably has a pair of camming surfaces 42 positioned adjacent to lugs 20 and 22 or otherwise near the ends of the segments. Camming surfaces 42 preferably face outwardly away from space 32 and are angularly oriented, as shown in FIG. 2B, with respect to an axis 43 oriented substantially tangential to the key 30. The camming surfaces have an angular orientation 45 that forms a wedge 46 adjacent to each lug, also shown in FIG. 4. As the segments 16 and 18 are brought into engagement with grooves 34 and 36 to connect pipe 12 to pipe 14 as illustrated in FIG. 5, the camming surfaces 42 (see FIG. 2) are the first surfaces to engage the grooves 34 and 36. The wedge 46 formed by the camming surfaces 42 provides a mechanical advantage which forces the pipes 12 and 14 apart from one another as the lugs 20 and 22 of segments 16 and 18 are brought toward one another, preferably into pad-to-pad engagement. This wedging action ensures that a separation gap 38 between the pipe ends (see FIG. 5) will be achieved when the connection between the pipes 12 and 14 is effected while reducing the force required to bring the lugs 20 and 22 toward each other. Lugs 20 and 22 are normally drawn toward each other by tightening nuts 26 (see FIG. 1). The mechanical advantage obtained by the use of wedge 46 significantly reduces the torque applied to nuts 26 needed to bring the lugs 20 and 22 into pad-to-pad engagement to separate the pipes 12 and 14 by the gap 38, and thereby allows large diameter, heavy pipes to be manually connected, even when stacked vertically above one another. Such configurations are a particular problem as the insertion of the keys 30 into the grooves 34 and 36 must lift the entire weight of the pipe to form the gap 38. The wedge 46 makes this effort significantly easier. Preferably, as shown in FIG. 2B, the angular orientation 45 of camming surfaces 42, as measured with respect to axis 43, is preferably about 5°, but may be up to about 10° for practical designs.

Figure 4:
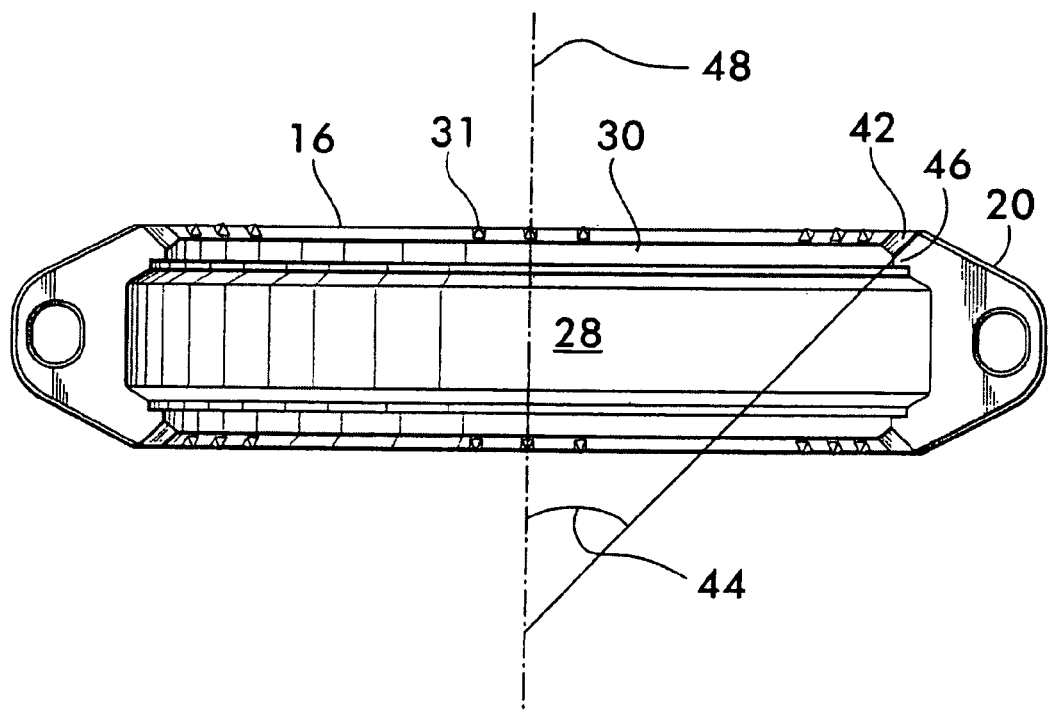
FIG. 4 is a bottom view of the segment shown in FIG. 3.
Figure 4A:
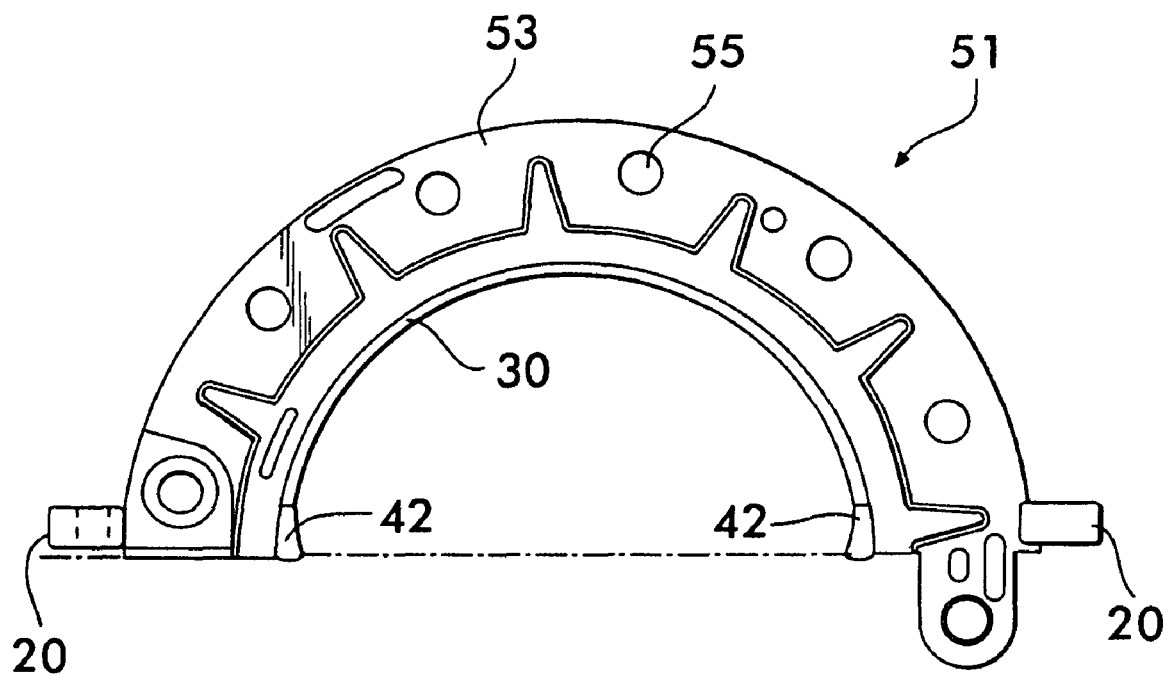
FIG. 4A is a side view of an alternate embodiment of a segment having one key and a flange for mating with flanged pipes or fittings.

The use of keys having camming surfaces is not confined to couplings for joining grooved pipes to one another, but may be used on practically any coupling arrangement having at least one key. FIG. 4A shows a coupling segment 51 used in conjunction with a similar coupling segment to attach grooved pipe to flanged pipe. Coupling segment 51 has an arcuate key 30 with camming surfaces 42 at either end. As described above, the camming surfaces may be angularly oriented tangentially with respect to the key 30 and form a wedge 46 as shown in FIG. 4. Opposite the key is a flange 53 adapted to engage a mating flange on a flanged pipe. The flanges are secured via fasteners that pass though bolt holes 55 as is understood for flanged connections. The coupling segment 51 is attached end to end to its associated coupling segment by attachment means, preferably lugs 20 positioned near the ends of the segment that align and are engaged by fasteners as is understood in the art and described above.

Figure 5A:
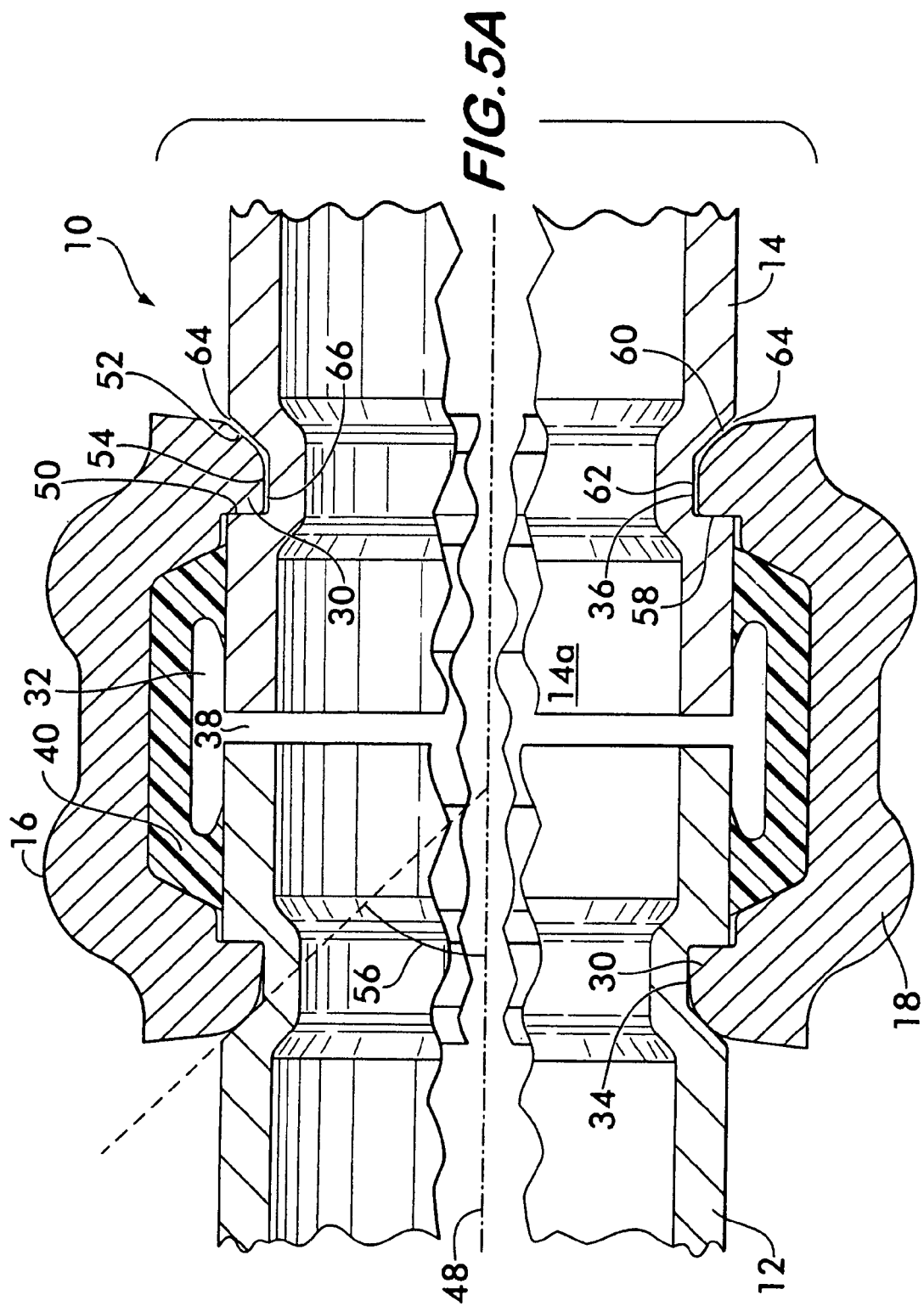
FIGS. 5A and 5B are cross sectional views taken at line 5-5 of FIG. 1 showing alternate embodiments of the coupling according to the invention.

As best shown in FIGS. 5 and 5A, keys 30 preferably have a shape that will effect a wedging action when they engage grooves 34 and 36. FIG. 5 illustrates one configuration wherein keys 30 have a wedge-shaped cross section. The keys 30 are defined by an inner surface 50 facing space 32, an outer surface 52 facing outwardly away from space 32, and a radial surface 54 positioned between the inner and outer surfaces and facing radially inwardly toward the pipes engaged by the coupling. Preferably, the inner surface 50 is oriented substantially perpendicularly to the axis 48 and outer surface 52 is oriented angularly relative to the axis 48 so as to form the wedge-shaped cross section of keys 30. The relative angle 56, measured radially with respect to the key between the outer surface 52 and an axis 48 oriented substantially co-axially with the longitudinal axes of pipes 12 and 14, ranges up to about 70°, although 50° is preferred (see also FIG. 1).

Although surfaces 52 and 54 in FIG. 5 are shown in cross-section as having a straight profile, they may be, for example, convex, concave or have some other profile shape and still effect a wedging action when engaged with grooves 34 and 36. An alternate embodiment of keys 30 is illustrated in FIG. 5A wherein surface 50 has a curved cross sectional profile in the form of a convex radius that substantially blends into radial surface 54.

As shown in FIG. 4, it is preferred that the radial angular orientation 44 of camming surfaces 42 be substantially equal to the radial angular orientation 56 of the key outer surface 52 as measured relatively to the longitudinal axis 48. It is advantageous to match the radial orientation angles of the camming surfaces 42 and the key outer surfaces 52 with one another to avoid point contact when the surfaces engage facing surfaces of the grooves 34 and 36 as the coupling is installed in order to mitigate gouging between the surfaces that results from point to point contact.

Preferably, the grooves 34 and 36 that keys 30 engage have a shape that is complementary to the wedge-shape cross section of the keys. In general, it is advantageous that the keys have a cross sectional shape that substantially fills the grooves even when the shapes of the groove and key are not exactly complementary. Groove 36 is described in detail hereafter, groove 34 being substantially similar and not requiring a separate description. Groove 36 is defined by a first side surface 58 positioned proximate to end 14a of pipe 14, a second side surface 60 positioned in spaced apart relation to the first side surface 58 and distally from the end 14a, and a floor surface 62 that extends between the first and second side surfaces. The complementary shape of the groove 36 to the keys 30 is achieved by orienting the floor surface 62 substantially parallel to the radial surface 54, orienting the first side surface 58 substantially perpendicularly to the floor surface 62 (and thus substantially parallel to the inner surface 50), and orienting the second side surface 60 substantially parallel to the outer surface 52 (and thus angularly to the floor surface 62).

Preferably, the keys 30 and the lugs 20 and 22 are sized and toleranced so that when the lugs 20 are in pad-to-pad engagement with the lugs 22, i.e., in contact with each other as shown in FIG. 1, the keys 30 engage the grooves 34 such that the keys' outer surface 52 is either just contacting the second side surface 60 in what is called "line-on-line clearance" (see the left halt of FIG. 5), or is in spaced relation to the second side surface 60 of the groove, as defined by a gap 64 no greater than 0.035 inches (shown on the right half of FIG. 5. Furthermore, the radial surface 54 is also in either line on line clearance with the floor surface 62 (left half, FIG. 5), or in spaced relation to floor surface 62, as defined by a gap 66 no greater than 0.030 inches (right half, FIG. 5). The inner surface 50 is nominally in contact with the first side surface 58 as shown in FIG. 5, but there may be a gap there as well for certain tolerance conditions. As a practical matter, however, it is difficult and costly to make pipes and couplings perfectly round and to the exact dimensions desired, so that there will be intermittent contact between various surfaces of the keys 30 and grooves 34 and 36 circumferentially around any pipe joint, creating an effectively rigid joint. Joint rigidity may be further augmented by the use of teeth 31 that project outwardly from the various surfaces of keys 30 as best shown in FIG. 2. Teeth 31 bite into the groove surfaces of the pipes, augmenting friction to help prevent rotational displacement of the pipes relatively to the couplings. The same relationships between the various surfaces mentioned above may also be achieved when the lugs are attached to one another in spaced apart relation as shown in FIG. 1A.

Analogous relationships between the key surfaces and the surfaces comprising the grooves are contemplated even when the keys do not have a shape complementary to that of the groove, as shown in FIG. 5A. Couplings having such keys, for example, the convex shaped key 30, may have surfaces 52 that just contact the second side surface 60 in line on line clearance (left side, FIG. 5A), or be in spaced relation to surface 60 (right side, FIG. 5A), having a gap 64 between the surfaces 52 and 60 of about 0.035 inches. Again, surfaces 54 and 66 may also be in line on line clearance or may be separated by a gap 62, preferably no greater than 0.030 inches.

Figure 5B:
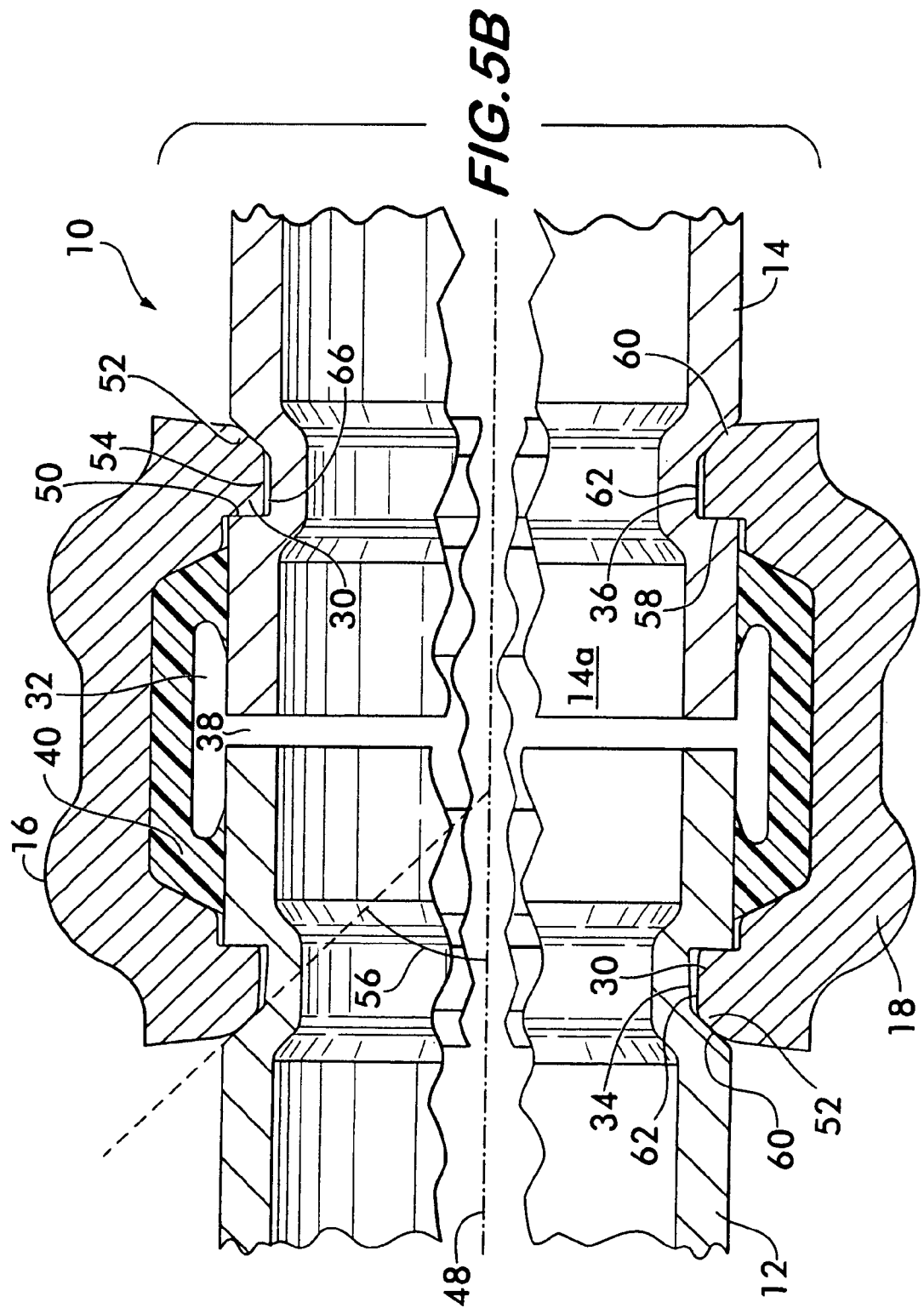

Alternately, as shown in FIG. 5B, wedging action of keys 30 may also be ensured when inner surface 50 and outer surface 52 contact groove surfaces 58 and 60, respectively, but radial surface 54 is in spaced relation to the groove's floor surface 62 with a gap 66. The right side of FIG. 5B shows various straight sided key surfaces 50, 52 and 54 and counterpart straight sided groove surfaces 58, 60 and 62 giving the groove and the key substantially complementary shapes. The left side of FIG. 5B shows a convexly curved outer surface 52 engaging a straight surface 60, as an example wherein the shape of the key and the groove are not substantially complementary. Note that groove floor surface 62 is shown on the left side to be angularly oriented with respect to the surface of pipe 12.

It is found that the preferred configuration defined by pad-to-pad engagement of lugs 20 and 22 in conjunction with the tolerance conditions as describe above provides several advantages. The engagement of inner surface 50 with first side surface 58 forces pipes 12 and 14 into substantially precise axial position relative to one another. Because these surfaces bear against one another when the coupling is installed on the pipes they will not shift axially when internal fluid pressure is applied. Thus, designers need not take into account lengthening of the piping network due to internal pressure during use, thereby simplifying the design. The relatively small gaps 64 and 66 (which could be zero) ensure adequate rigidity and prevent excessive angular displacement between the pipes and the couplings, while the tolerances necessary to limit the gaps within the desired limits allow the coupling 10 to be manufactured economically. It also allows the grooves in the pipes, valves or other fittings to be manufactured economically. The gaps work advantageously in conjunction with the normally encountered out of roundness of practical pipes to provide a rigid joint. The pad-to-pad engagement of lugs 20 and 22 provides a reliable visual indication that the coupling 10 is properly engaged with the pipes 12 and 14.

If it is desired to have a more flexible coupling 10 to allow greater angular deflection, then the gaps 64 and 66 at one or both ends of the coupling may be made larger than the aforementioned limit of 0.035 inches. For flexible couplings, it is found advantageous to have gap 64 between surfaces 52 and 60 preferably be ½ of the size of gap 38 between the ends of pipes 12 and 14 as shown in FIG. 5.

It is also feasible to have keys 30 engage grooves 34 and 36 without a gap under all tolerance conditions. This configuration takes advantage of the wedging action of the keys to provide a rigid joint. It is not practical, however, to have this configuration and also maintain pad to pad engagement of lugs 20 and 22 because it is very difficult to economically manufacture couplings and pipes to the necessary tolerances to ensure both pad to pad engagement and full contact circumferential wedging engagement of the keys and grooves. For the configuration wherein pad-to-pad engagement is not nominally held, as shown in FIG. 9, it is preferred to employ a tongue 110 adjacent to the lug 20 on segment 16 that fits into a recess 112 adjacent to lug 22 on segment 18. The tongue prevents sealing member 40 from blowing out through a gap between the lugs 20 and 22 when the joint is subjected to high internal pressure.

Figures 6, 7:
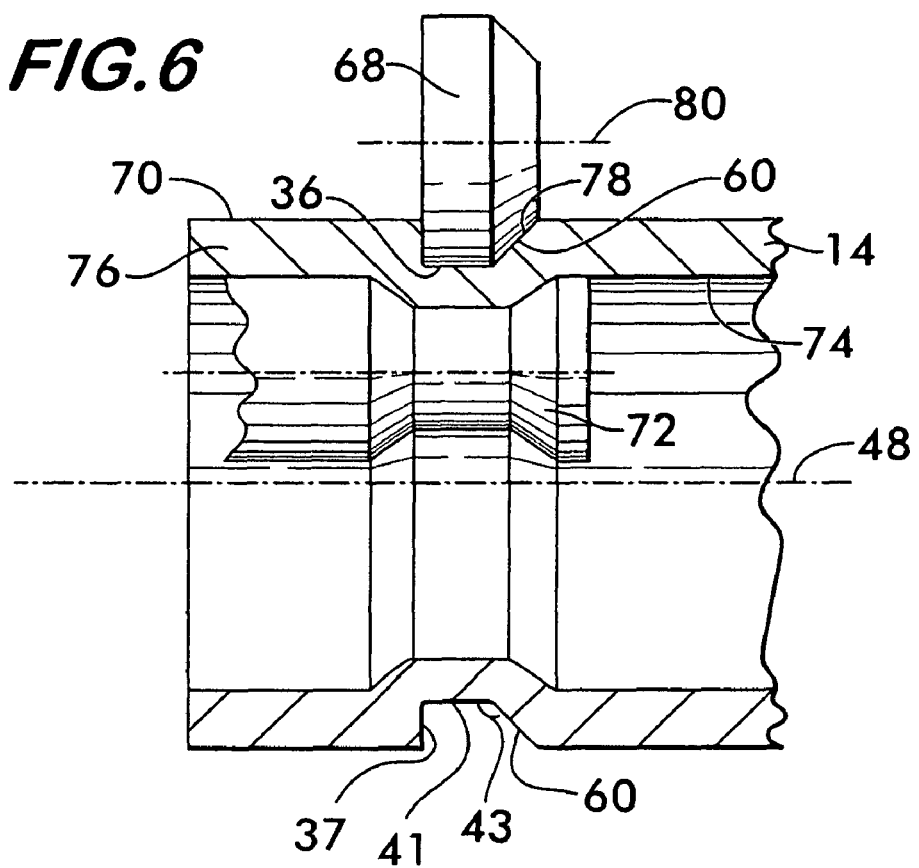
FIGS. 6 and 7 are side views of a roller tool forming a groove in a pipe.

As illustrated in FIG. 6, groove 36 is advantageously formed by cold working the material forming pipe 14. In a preferred embodiment, groove 36 comprises a first side surface 37 positioned proximate to the end of pipe 14, a second side surface 60 positioned in spaced apart relation to the first side surface and distally to the end of the pipe, and a floor 41 that extends between the first and second side surfaces. Preferably, the second side surface is angularly oriented relatively to the floor at an angle 43 that is than 90 degrees.

A roller tool 68 is used having a cross sectional shape at its periphery substantially identical to the desired shape of the groove. The roller tool 68 is forcibly engaged with the outer surface 70 of pipe 14 around its circumference, either by moving the roller tool around the pipe or moving the pipe about its longitudinal axis 48 relatively to a roller tool. Preferably, a back-up roller 72 engages the inner surface 74 of the pipe 14 opposite to the roller tool 68. The pipe wall 76 is compressed between the roller tool 68 and the back-up roller 72. Use of the back-up roller 72 provides a reaction surface for the roller tool. The back-up roller also helps ensure that accurate groove shapes are achieved by facilitating material flow during roll grooving.

During cold working to form the groove 36 having the angularly oriented second side surface 60, it is found that significant friction is developed between the roller tool 68 and the pipe 14. The friction is caused by the contact between the angled surface 78 on the roller tool 68 that forms the angularly oriented second side surface 60 of groove 36. Because it is angled, points along angled surface 78 are at different distances from the axis of rotation 80 of roller tool 68. Due to their different distances from the axis 80, each of the points on the surface 78 will move relative to one another at a different linear speed for a particular angular velocity of the roller tool 68. The points farthest from the axis 80 move the fastest and the points closest to the axis move the slowest. Thus, there is a velocity differential along the angled surface 78 which causes the surface to slip relatively to the second side surface 60 of groove 36 as the roller tool 68 rotates relatively to the pipe 14 to form the groove. The relative slipping between the roller tool and the pipe causes the friction. Excessive heat caused by the friction can result in a break down of the roller tool bearing lubricants and make the roller tool too hot to handle when changing tools for a different size pipe. The roller tool must be allowed to cool before it can be changed, resulting in lost time.

To mitigate the generation of excessive heat, the roller tool 82, shown in FIG. 7, is used to form a groove 84 in pipe 14. In groove 84, the second side surface 86 has a first surface portion 88 oriented angularly relative to the floor surface 90, and a second surface portion 92, positioned adjacent to the floor surface 90 and oriented substantially perpendicular to it, thereby reducing the size of the angularly oriented second side surface 86. By reducing the size of the angled surface regions on both the roller tool 82 and the groove 84 the friction caused during cold working to form the groove is reduced. The first surface portion 88, being angularly oriented, still provides the advantages as described above for the second side surface 60. An example of a coupling 10 engaging a groove 84 is shown in FIG. 8.

The roller tool 82 has a circumferential surface 94 with a cross sectional shape complementary to groove 84, the shape comprising a first perimetral surface 99 oriented substantially perpendicularly to the axis of rotation 80 of roller tool 82, a second perimetral surface 98 positioned in spaced relation to the first perimetral surface 96 and oriented substantially perpendicular to the axis 80, a radial surface 100 extending between the first and second perimetral surfaces and oriented substantially parallel to axis 80, and an angled surface 102 positioned adjacent to perimetral surface 100 and oriented angularly to the axis 80. The angled surface 102 is preferably oriented up to about 70° relatively to axis 80, and most preferably at about 50°. Surface 102 slopes away from the second perimetral surface, thereby making contact with the pipe when forming the groove 84.

Figure 10:
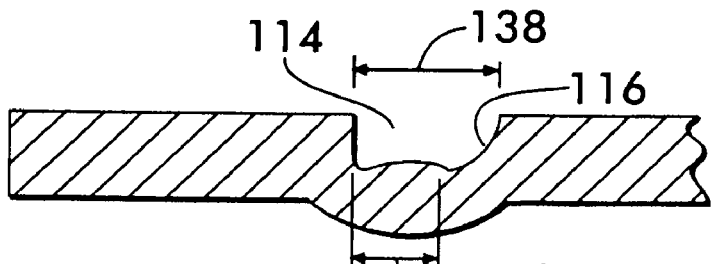
FIGS. 10-15 are longitudinal sectional views of embodiments of pipes having circumferential grooves according to the invention.
Figure 11:
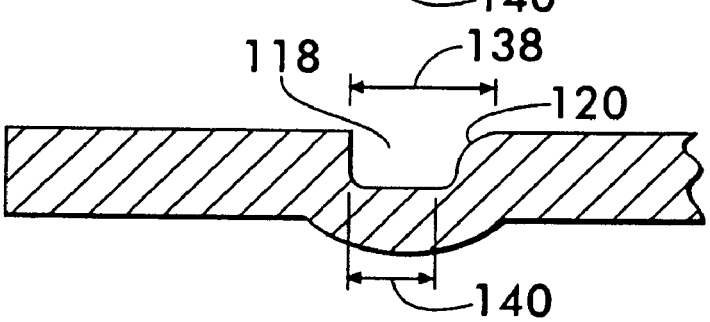
Figure 12:
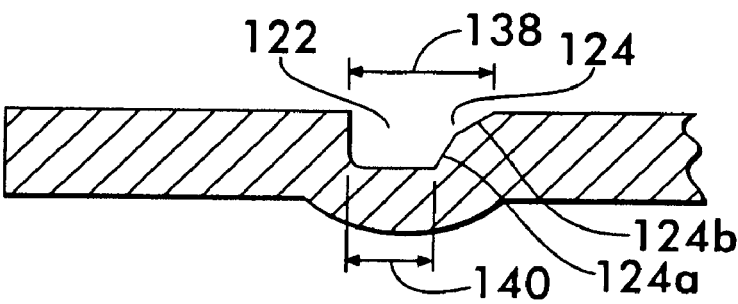
Figure 13:
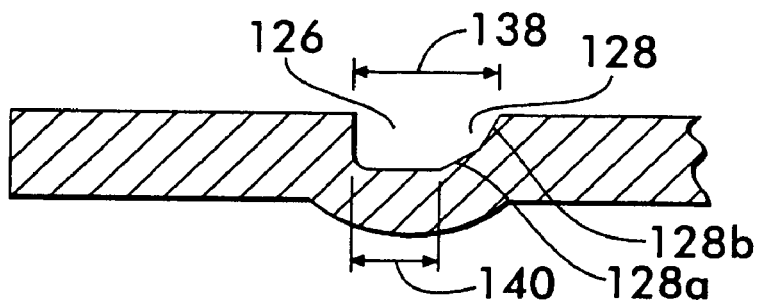
Figure 14:
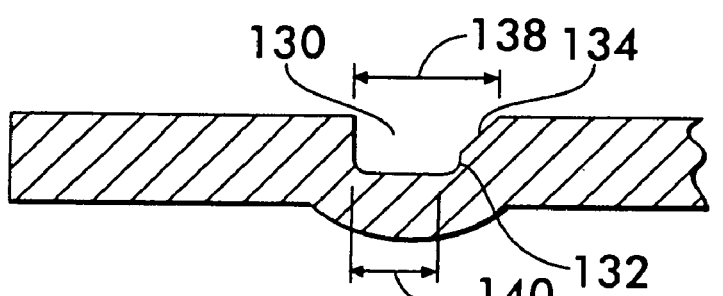
Figure 15:
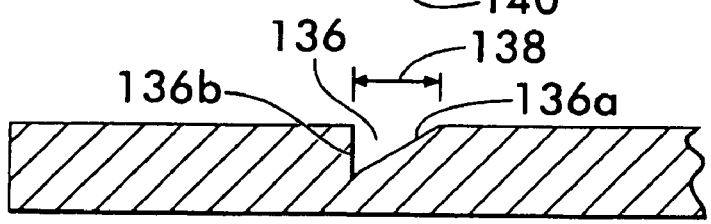

Wedging action between the keys 30 and grooves in the pipes can be achieved for groove cross sectional shapes other than those described above. The main criterion for wedging action is that the width of the groove at the surface of the pipe be greater than the width of the groove at the floor of the groove. FIGS. 10-15 show various groove configurations meeting this criteria. FIG. 10 shows a groove 114 partially defined by a side portion 116 having a concave cross sectional shape. FIG. 11 shows a groove 118 partially defined by a side portion 120 having a convex cross-sectional shape. In FIG. 12, the groove 122 is partially defined by a side portion 124 having first and second angled portions 124a and 124b, the first angled portion 124a having a greater slope than the second angled portion 124b. FIG. 13 shows a groove 126 partially defined by a side portion 128 having a first angled portion 128a with a slope less than the second angled portion 128b. Combinations of radius and angled portions are also feasible, as shown in FIG. 14, wherein groove 130 has a radius portion 132 and an angled portion 134. FIG. 15 illustrates an example of a groove 136 having a wedge-shaped cross sectional profile, there being no floor portion of any significance as compared with the other example grooves. The groove 136 is defined by side portions 136a and 136b oriented angularly with respect to one another. Common to all of the designs is the characteristic that the width 138 of the groove at the surface of the pipe is greater than the width 140 of the groove at the floor of the groove. Note that, although it is preferred that the floor be substantially parallel to the pipe surface, it may also be curved, as shown in FIG. 10, or non-existent, as shown in FIG. 15, which has no floor, the floor width being essentially zero. The floor may also be angularly oriented as shown in FIG. 5B.

Figure 7A:
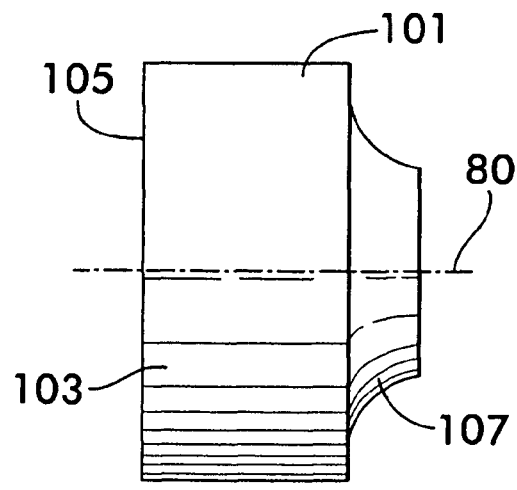

Roller tools for creating grooves as described above are shown in FIGS. 7A-7G. In FIG. 7A, roller tool 101 is rotatable about axis 80 and has a radially facing surface portion 103 flanked by a first surface portion 105 and a second surface portion 107. Roller surface portion 105 is preferably oriented perpendicularly to axis 80 and results in the formation of a substantially vertical groove side surface. Roller surface portion is concave and results in the convex groove side surface 120 as shown in FIG. 11.

Figure 7B:
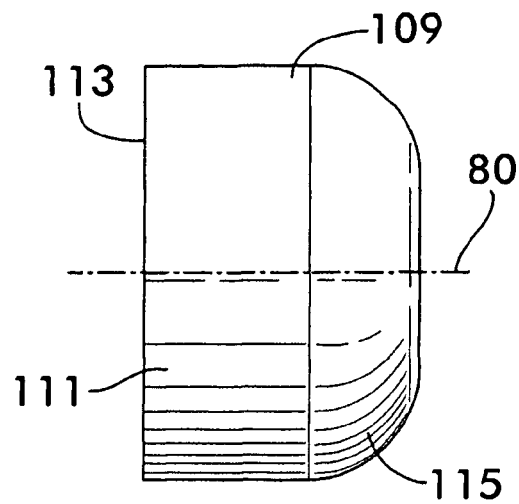

Similarly, roller tool 109, shown in FIG. 7B, has a radially facing surface portion 111 extending between a perpendicular surface portion 113 and a convex surface portion 115. Such a roller produces a groove with a concave side surface 116 as shown in FIG. 10.

Figure 7C:
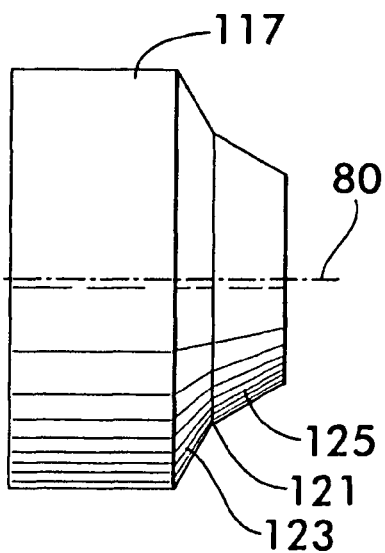
Figure 7D:
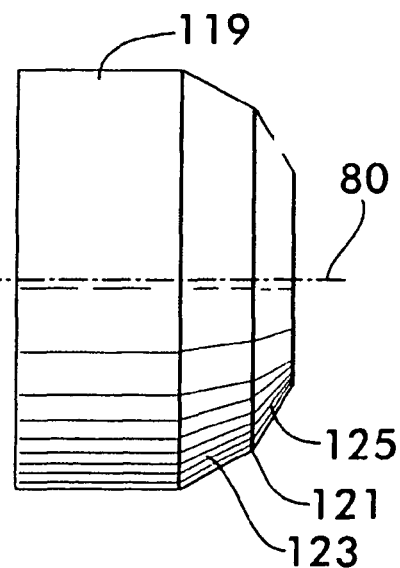

Additional roller embodiments 117 and 119, shown in FIGS. 7C and 7D, each have a surface portion 121 with a first face 123 angularly oriented with respect to axis 80, and a second face 125, also angularly oriented with respect to axis 80, but at a different angle. In roller tool 117, the slope of the first surface portion is greater than the slope of the second surface portion, and this roller produces a groove 122 as shown in FIG. 12. In roller tool 119, the slope of the first surface portion is less than the slope of the second surface portion, and this roller produces a groove 126, having an angularly oriented side surface 124 as shown in FIG. 13.

Roller tool 127, shown in FIG. 7E, has no radially facing surface, an angled surface 129 intersects with a surface portion 131 that is substantially perpendicular to the axis of rotation 80. Roller tool 127 is useful for creating the groove shown in FIG. 15.

Roller tool 133, shown in FIG. 7F, has a curved radially facing surface 135 and an angularly oriented surface 135 as well as a perpendicular surface 137. The curved surface may be convex, concave, sinusoidal, hyperbolic, or irregularly curved.

As shown in FIG. 7G, the roller 139 may have a radially facing surface 141 that is angularly oriented with respect to the axis of rotation 80. A groove as shown in FIG. 5B is produced by such a tool.

Figure 16:
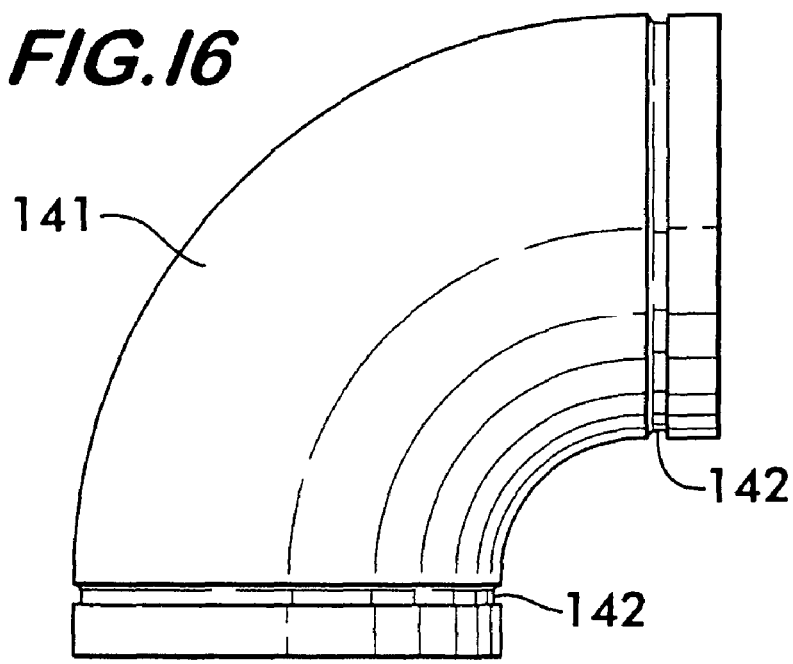
Figure 17:
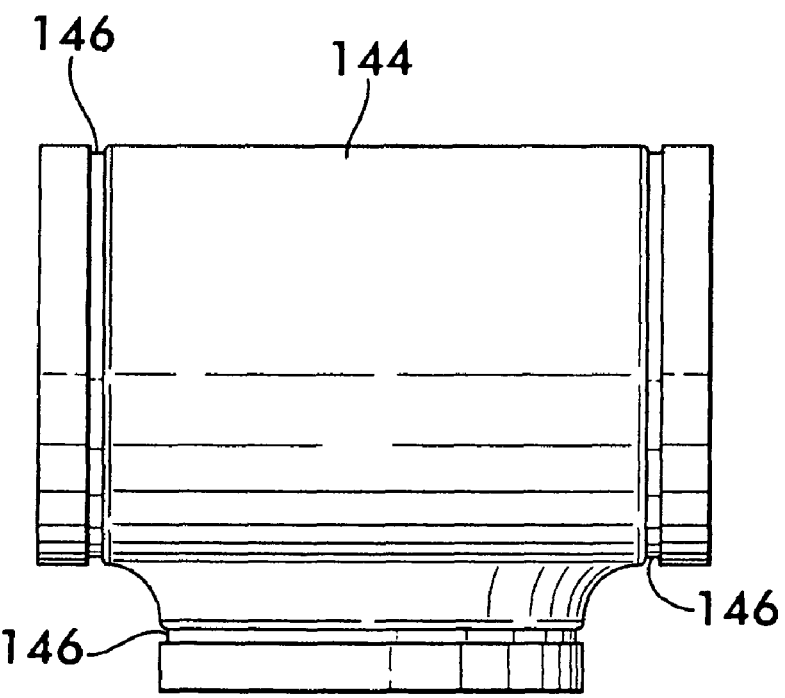

While grooves adapted to achieve significant wedging action with the keys of a coupling have been described applied to pipe ends, such grooves may also be used in conjunction with pipe fittings as well. For example, FIG. 16 shows an elbow fitting 140 having circumferential grooves 142 at either end. Grooves 142 may have any of the cross sectional profiles illustrated in FIGS. 5 and 10-15 or their variations as described above. Similarly, the Tee fitting 144 shown in FIG. 17 has grooves 146, preferably adjacent to each of its ends, the grooves being adapted to develop wedging action to couple the fitting to pipes or other fittings as described herein. FIG. 18 shows a fitting 148 having a wedging groove 150 adjacent to one end and a flange 152 at the opposite end. Fitting 148 allows a piping network using mechanical couplings to be joined to another network coupled using flanges. Furthermore, as illustrated in FIGS. 19 and 20, other types of fittings such as a reducer 154 (FIG. 19) used to join pipes having different diameters, or a nipple 156 (FIG. 20) may also benefit from having respective grooves 158 and 160 that are like those illustrated and described above that increase the wedging action between the coupling and the groove to ensure either a stiffer or more flexible joint, depending upon the tolerances of the coupling as described above.

As further shown in FIG. 21, components related to control of fluid flow, such as a valve 162 may also have grooves 164 that are like those described above to couple the valve to pipes, fittings or other components using mechanical couplings as described herein.

Pipe couplings according to the invention incorporate the advantages of a rigid or flexible connection with a reliable visual indicator for confirming that the coupling properly engages the pipes to effect a fluid tight joint. The couplings provide a mechanical advantage which allows manual assembly of piping networks of substantial diameter despite their weight. The couplings have tolerances allowing them to be economically produced and still yield a substantially rigid joint between pipes.

What is claimed is:

1. A method for connecting pipe elements together end-to-end, said method comprising:

using a pair of pipe elements, each having a circumferential groove therein, each said groove being positioned proximate to an end of a respective one of said pipe elements, each said groove having an angularly oriented side surface facing said end of said respective one of said pipe elements;

using a coupling comprising a plurality of segments joined end-to-end by a plurality of adjustably tightenable fasteners, each of said segments having a pair of keys projecting radially inwardly, said keys being positioned in spaced apart relation from one another and defining a space therebetween, at least one of said keys on one of said segments having a first camming surface positioned adjacent to one end of said segment, said first camming surface facing away from said space between said keys and being angularly oriented relatively thereto and having a radial orientation angle substantially the same as said angularly oriented side surface of one of said grooves;

positioning a first and a second of said pipe elements in end-to-end relation;

positioning said plurality of segments surrounding ends of said first and second pipe elements;

engaging said first camming surface with said angularly oriented side surface of said groove in one of said first and second pipe elements;

applying said fasteners to said segments; and tightening said fasteners so as to draw said segments toward one another, said first camming surface sliding into said groove against said angularly oriented side surface and thereby moving said first and second pipe elements away from one another.

2. The method according to claim 1, further comprising positioning a sealing member surrounding said ends of said first and said second pipe elements.

3. The method according to claim 1, further comprising placing ends of said first and second pipe elements in abutting relationship.

4. The method according to claim 1, further comprising forming a groove in each of said first and second pipe elements by forming a first side surface proximate to an end of said pipe elements, forming a second side surface positioned in spaced relation to said first side surface and distal to said end of said pipe, forming a floor that extends between said first and second side surfaces, said second side surface of said one groove comprising said angularly oriented side surface.

5. The method according to claim 4, further comprising forming said first side surface substantially perpendicularly to a long axis of said pipe element.

6. The method according to claim 5, further comprising further tightening said fasteners and thereby forcing said keys into said grooves.

7. The method according to claim 6, further comprising contacting said first side surfaces in each of said grooves with said keys.

8. The method according to claim 7, wherein said segments further comprise lugs positioned at each end thereof, said lugs being adapted to receive said fasteners, one of said lugs on each of said segments being in facing relation with one of said lugs on another of said segments, said method further including tightening said fasteners so as to bring said lugs in facing relation into contact with one another thereby forming a rigid joint.

9. A method for connecting pipe elements together end-to-end, said method comprising:

using a pair of pipe elements, each having a circumferential groove therein, each said groove being positioned proximate to an end of a respective one of said pipe elements, each said groove having an angularly oriented side surface facing said end of said respective one of said pipe elements;

using a coupling comprising first and second segments joined end-to-end by a plurality of adjustably tightenable fasteners, each of said segments having a pair of keys projecting radially inwardly, said keys being positioned in spaced apart relation from one another and defining a space therebetween, each of said keys having a first camming surface positioned adjacent to one end of said segment, and a second camming surface positioned adjacent to an opposite end of said segment, said camming surfaces facing away from said space between said keys and being angularly oriented relatively thereto and having a radial orientation angle substantially the same as said angularly oriented side surface of one of said grooves;

positioning a first and a second of said pipe elements in end-to-end relation;

positioning said first and second segments surrounding ends of said first and second pipe elements;

engaging said camming surfaces with said angularly oriented side surfaces of said grooves in said first and second pipe elements;

applying said fasteners to said segments; and tightening said fasteners so as to draw said segments toward one another, said camming surfaces sliding into said grooves against said angularly oriented side surfaces and thereby moving said first and second pipe elements away from one another.

10. The method according to claim 9, further comprising positioning a sealing member surrounding said ends of said first and said second pipe elements.

11. The method according to claim 9, further comprising placing ends of said first and second pipe elements in abutting relationship.

12. The method according to claim 9, further comprising forming a groove in each of said first and second pipe elements by forming a first side surface proximate to an end of said pipe elements, forming a second side surface positioned in spaced relation to said first side surface and distal to said end of said pipe, forming a floor that extends between said first and second side surfaces, said second side surface comprising said angularly oriented side surface.

13. The method according to claim 12, further comprising forming said first side surfaces substantially perpendicularly to a long axis of said pipe element.

14. The method according to claim 13, further comprising further tightening said fasteners and thereby forcing said keys into said grooves.

15. The method according to claim 14, further comprising contacting said first side surfaces in each of said grooves with said keys.

16. The method according to claim 15, wherein said segments further comprise lugs positioned at each end thereof, said lugs being adapted to receive said fasteners, one of said lugs on each of said segments being in facing relation with one of said lugs on another of said segments, said method further including tightening said fasteners so as to bring said lugs in facing relation into contact with one another thereby forming a rigid joint.

* * * * *